US012276415B1

(12) United States Patent
Redding

(10) Patent No.: US 12,276,415 B1
(45) Date of Patent: Apr. 15, 2025

(54) LIGHT EMITTING DIODE (LED) LIGHTING DEVICE OR LAMP WITH OPTICAL EFFECTS

(71) Applicant: Feit Electric Company, Inc., Pico Rivera, CA (US)

(72) Inventor: Matthew James Redding, Melbourne (AU)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

(21) Appl. No.: 18/479,284

(22) Filed: Oct. 2, 2023

(51) Int. Cl.

| | |
|---|---|
| ***F21V 3/04*** | (2018.01) |
| ***F21V 3/02*** | (2006.01) |
| ***F21V 21/008*** | (2006.01) |
| ***F21Y 105/12*** | (2016.01) |
| ***F21Y 105/18*** | (2016.01) |
| ***F21Y 113/13*** | (2016.01) |
| ***F21Y 115/10*** | (2016.01) |

(52) U.S. Cl.
CPC ................ *F21V 3/049* (2013.01); *F21V 3/02* (2013.01); *F21V 21/008* (2013.01); *F21Y 2105/12* (2016.08); *F21Y 2105/18* (2016.08); *F21Y 2113/13* (2016.08); *F21Y 2115/10* (2016.08)

(58) Field of Classification Search
CPC ........... F21V 3/049; F21V 3/02; F21V 21/008
See application file for complete search history.

(56) References Cited

U.S. PATENT DOCUMENTS

| | | | | |
|---|---|---|---|---|
| 6,654,172 | B2 * | 11/2003 | Pond | F21S 43/14 359/743 |
| 7,407,303 | B2 * | 8/2008 | Wanninger | F21S 43/237 385/146 |
| 7,896,521 | B2 * | 3/2011 | Becker | F21V 14/06 362/240 |
| 8,637,877 | B2 * | 1/2014 | Negley | F21V 3/12 257/89 |
| 10,125,953 | B2 * | 11/2018 | Quadri | F21V 14/02 |
| 10,172,203 | B2 * | 1/2019 | Harada | F21V 5/007 |
| 10,190,751 | B2 * | 1/2019 | JØrgensen | F21V 14/00 |
| 10,696,211 | B2 * | 6/2020 | Fleszewski | B60Q 1/2607 |
| 10,746,372 | B2 * | 8/2020 | Sousek | F21S 43/31 |
| 10,775,554 | B2 * | 9/2020 | Kawano | G02B 5/0215 |
| 2011/0310587 | A1 * | 12/2011 | Edmond | G02B 6/0096 362/84 |

(Continued)

OTHER PUBLICATIONS

Feit Electric, "Images of Optics Used in Feit Electric String Lights-Model Nos. 72031 and 72018", (taken on Oct. 2, 2023), Applicant's Personal Collection.

(Continued)

*Primary Examiner* — Arman B Fallahkhair
(74) *Attorney, Agent, or Firm* — Alston & Bird LLP

(57) ABSTRACT

LED lamps and/or LED lighting devices including LED lamps are provided. An LED lamp includes two or more sets of LED packages. Each set of LED packages comprises at least one respective LED package. The two or more sets of LED packages comprising a first set of LED packages and a second set of LED packages. The LED lamp further includes a first optical element configured to control light dispersion of light emitted by the first set of LED packages; and at least one additional optical element configured to control light dispersion of light emitted by the second set of LED packages.

15 Claims, 42 Drawing Sheets

(56) References Cited

U.S. PATENT DOCUMENTS

| | | | | |
|---|---|---|---|---|
| 2014/0071674 A1* | 3/2014 | Tsai | G02B 19/0066 | 362/335 |
| 2015/0212263 A1* | 7/2015 | Tzeng | F21V 23/008 | 362/555 |

OTHER PUBLICATIONS

Feit Electric, "Images of Optics Used in Feit Electric G 25 Bulb", (taken Nov. 28, 2023), Applicant's Personal Collection.
Feit Electric, "Images of Optics Used in Feit Electric BPS14 Bulb", (taken Nov. 28, 2023), Applicant's Personal Collection.
Feit Electric, "Images of Optics Used in Feit Electric PAR30S Adj Bulb", (taken Nov. 28, 2023), Applicant's Personal Collection.
Feit Electric, "Images of Optics Used in Feit Electric PAR38ADJGRW Bulb", (taken Nov. 28, 2023), Applicant's Personal Collection.
Feit Electric, "Images of Optics Used in Feit Electric BP40S11N Bulb", (taken Nov. 28, 2023), Applicant's Personal Collection.
Feit Electric, "Images of Optics Used in Feit Electric Picture Frame Bulb", (taken Nov. 28, 2023), Applicant's Personal Collection.
Feit Electric, "Images of Optics Used in Feit Electric String Light Feit SL12-6/Flame Clear", (taken Nov. 28, 2023), Applicant's Personal Collection.
Feit Electric, "Images of Optics Used in Feit Electric Bulb for String Light Feit SL12-6/Flame Amber", (taken Nov. 28, 2023), Applicant's Personal Collection.
Feit Electric, "Images of Optics Used in Feit Electric Bulb for String Light Feit SL 72018", (taken Nov. 28, 2023), Applicant's Personal Collection.
Feit Electric, "Images of Optics Used in Feit Electric OM1600R Bulb", (taken Nov. 28, 2023), Applicant's Personal Collection.

* cited by examiner

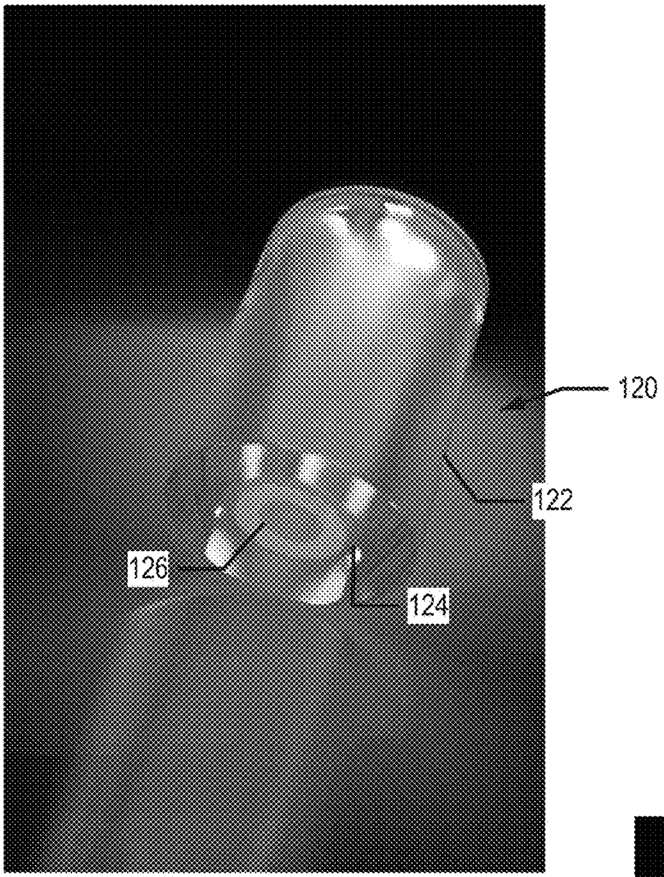
FIG. 14A
FIG. 14B
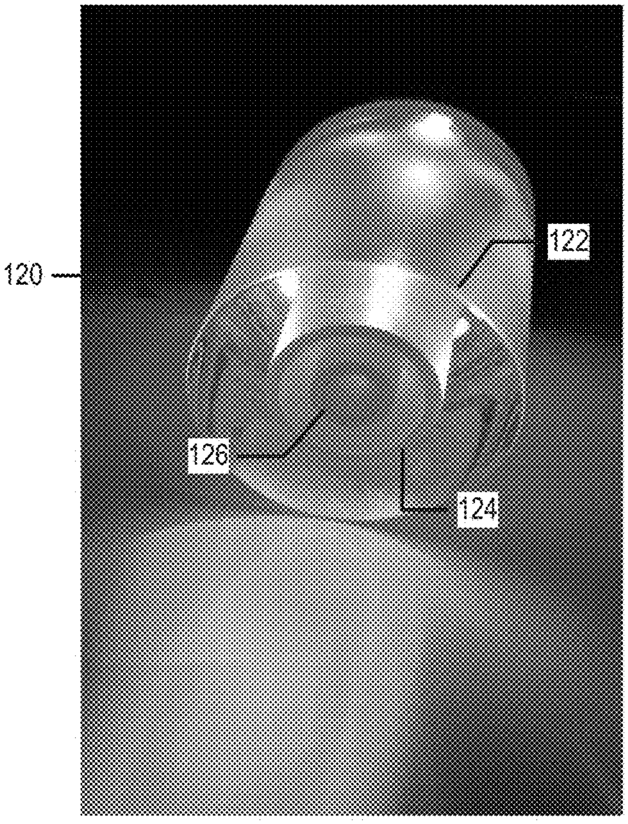

LIGHT EMITTING DIODE (LED) LIGHTING DEVICE OR LAMP WITH OPTICAL EFFECTS

BACKGROUND

Light emitting diodes (LEDs) for general and decorative lighting are well established but there are still some obstacles. LEDS are available in a wide range of colors, either as direct emitters or phosphor converted. When using surface mounted LED packages (surface mount device (SMD) type LEDs) and multiple color LEDs, optics are necessary to address light distribution, color mixing, and color effect issues. For example, when multiple color LEDs are present in an LED lamp or lighting device, the mixing of the colors via optics has a significant effect on the aesthetic appearance of light emitted by the LED lamp or lighting device.

BRIEF SUMMARY

In various embodiments, and LED lamp or and LED lighting device including at least one LED lamp is provided. The LED lamp includes two or more sets of LED packages and an optical assembly including two or more optical elements. Each optical element of the optical assembly is configured to control dispersion of light emitted by a corresponding set of LED packages.

According to one aspect, an LED lamp or an LED lighting device is provided. In an example embodiment, the LED lamp or the LED lighting device includes two or more sets of LED packages. Each of the two or more sets of LED packages includes at least one respective LED package. The two or more sets of LED packages include a first set of LED packages and a second set of LED packages. The LED lamp or LED lighting device further includes a first optical element configured to control light dispersion of light emitted by the first set of LED packages; and a second optical element configured to control light dispersion of light emitted by the second set of LED packages.

In an example embodiment, the two or more sets of LED packages are mounted in a concentric pattern and the first optical element and the second optical element are in a nested concentric pattern.

In an example embodiment, the first set of LED packages is configured to emit light of a first color and the second set of LED packages is configured to emit light of a second color.

In an example embodiment, the first color emitted from the first set of LED packages is different from the second color emitted from the second set of LED packages.

In an example embodiment, the first optical element and the second optical element are configured to be concentric structures.

In an example embodiment, the first optical element is configured outermost optical element, and wherein the at least one additional optical element is configured to be disposed within the first optical element.

In an example embodiment, the first optical element is configured to be an envelope of the LED lighting device or LED lamp.

In an example embodiment, at least one of (a) the first optical element comprises first diffusing particles, diffusing structure, or surface treatment or (b) the second optical element comprises second diffusing particles, structure, or surface treatment.

In an example embodiment, the LED lighting device or LED lamp further includes at least one additional set of LED packages; and at least one additional optical element, wherein the at least one additional optical element is configured to control dispersion of light emitted by the at least one additional set of LED packages.

In an example embodiment, the LED lighting device or LED lamp further includes an envelope, wherein the first optical element, second optical element, the at least one additional optical element are wedge-shaped.

According to another aspect, an LED lighting device or LED lamp is provided. The LED lighting device or LED lamp includes a lamp housing; a plurality of sets of LED packages mounted with respect to the lamp housing, wherein each of the plurality of sets of LED packages comprises a respective at least one individual LED package; and an optical assembly comprising a plurality of optical elements, wherein each optical element of the plurality of optical elements is configured to control light dispersion of light emitted by a respective set of LED packages of the plurality of sets of LED packages.

In an example embodiment, the plurality of sets of LED packages are mounted in a concentric pattern with respect to the lamp housing.

In an example embodiment, the plurality of sets of LED packages comprises a first set of LED packages configured to emit light of a first color and a second set of LED packages configured to emit light of a second color, wherein the first color and the second color are different from one another.

In an example embodiment, the LED lighting device or LED lamp, further includes an envelope, wherein the plurality of optical elements comprise a first optical element, a second optical element, and at least one additional optical element, and the first optical element, second optical element, the at least one additional optical element are wedge-shaped.

In an example embodiment, the plurality of optical elements of the optical assembly is configured to be arranged in a concentric structure.

In an example embodiment, the optical assembly comprises a first optical element and at least one additional optical element, and wherein the first optical element is configured to be the outermost layer of the optical assembly.

In an example embodiment, at least one of (a) the first optical element comprises first diffusing particles, diffusing structure, or surface treatment or (b) the additional optical element comprises additional diffusing particles, structure, or surface treatment.

In an example embodiment, the plurality of optical elements includes a plurality of nesting cylindrical or frustoconical structures.

In an example embodiment, the plurality of optical elements comprises a first optical element configured to be an envelope, and wherein the first optical element is configured to be attached and detached to the lamp housing.

In an example embodiment, the lamp housing is further configured to connect with one or more additional lamp housings such that the lamp housing and the one or more additional lamp housings are connected in a series.

In an example embodiment, the LED lighting device includes an installation structure.

BRIEF DESCRIPTION OF THE SEVERAL VIEW OF THE DRAWING(S)

Having thus described the invention in general terms, reference will now be made to the accompanying drawings, which are not necessarily drawn to scale, and wherein:

Figures 12A, 12B, 12C:
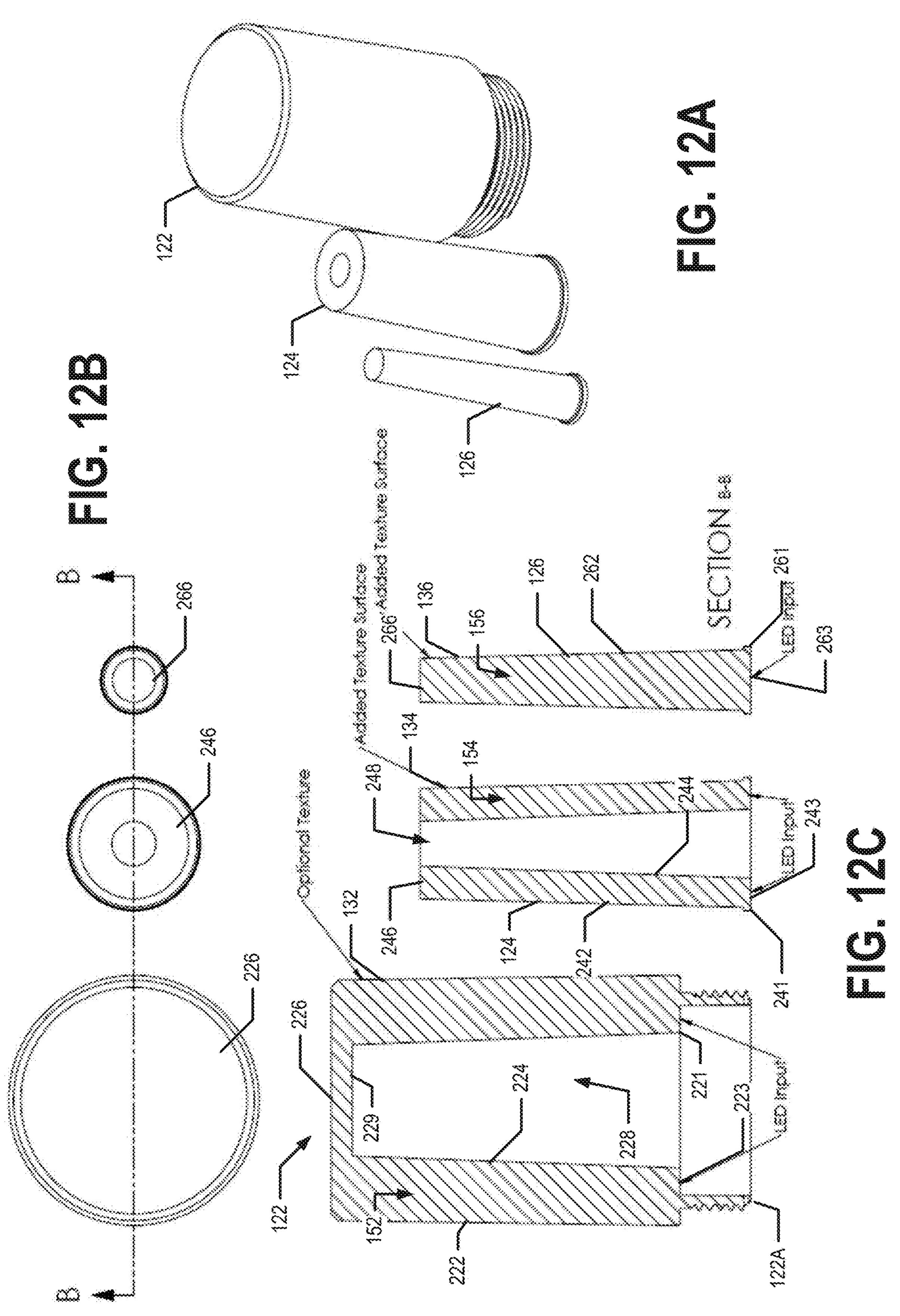
Figure 13A:
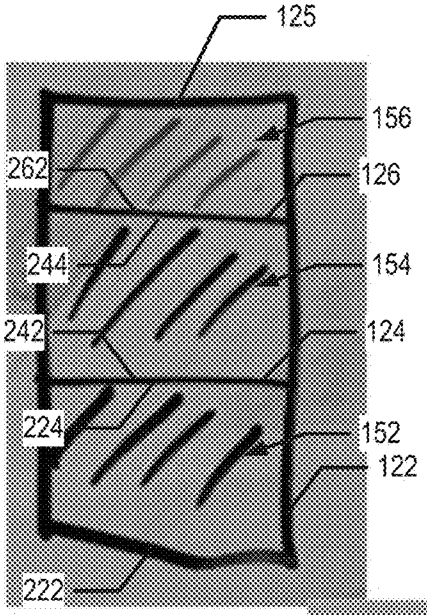
Figure 13B:
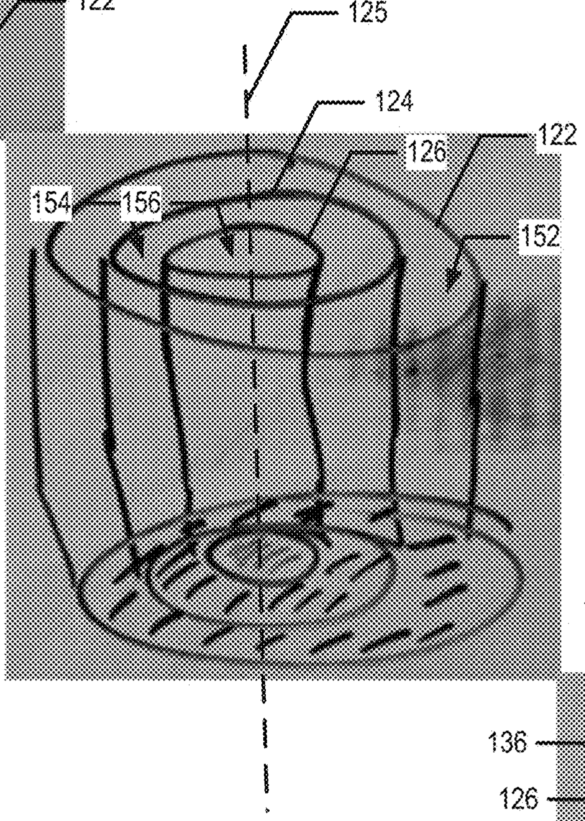
Figure 13C:
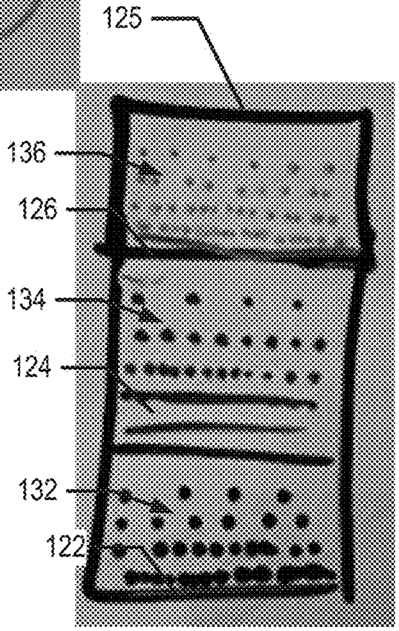
Figure 14C:
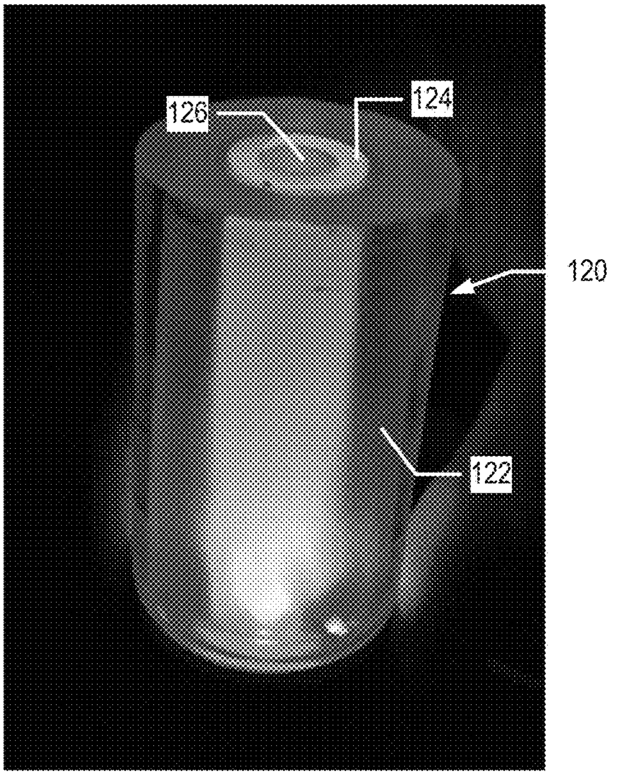
Figure 14D:
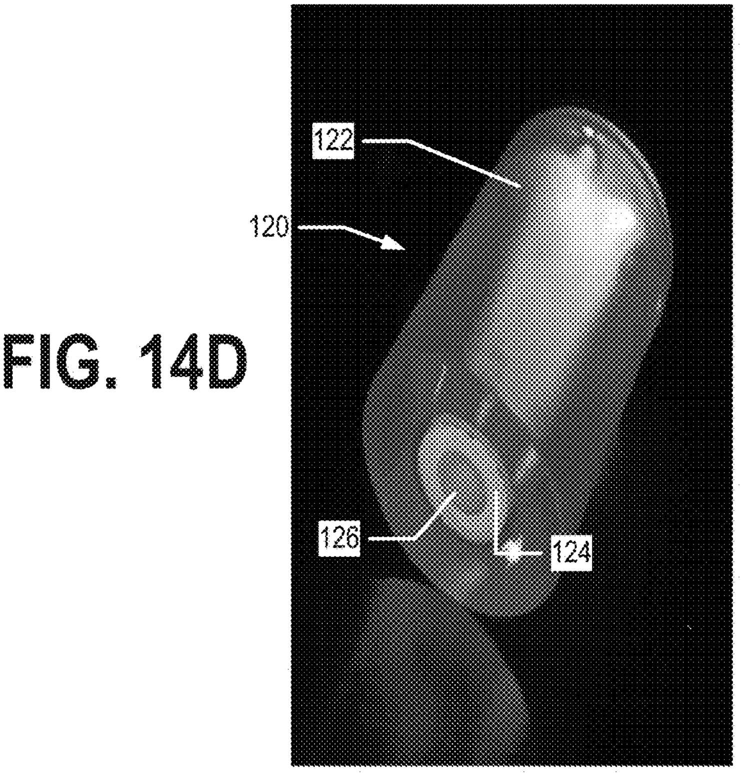
Figure 15:
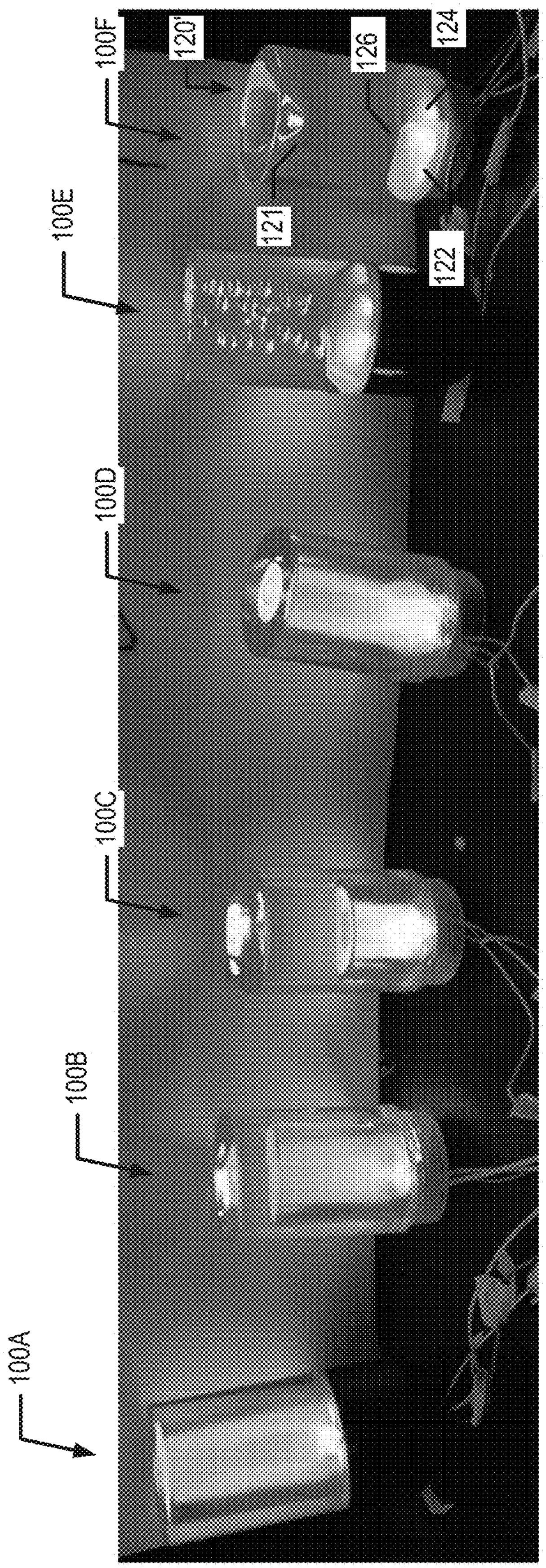
Figure 16A:
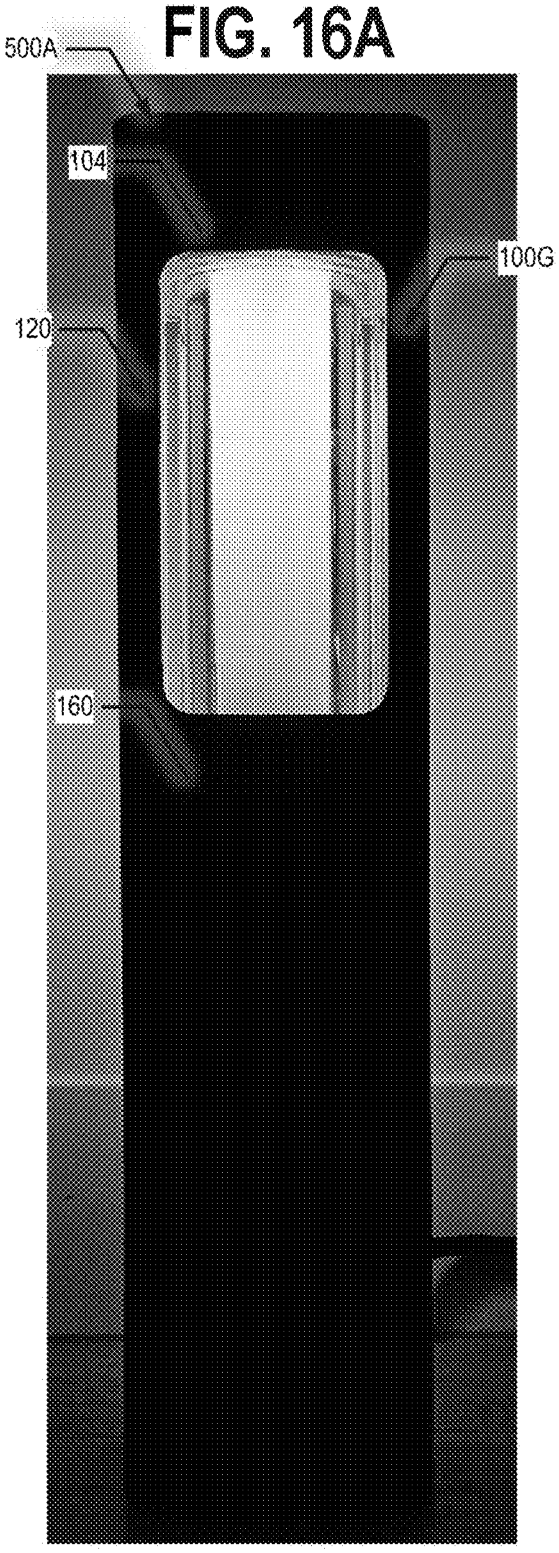
Figure 16B:
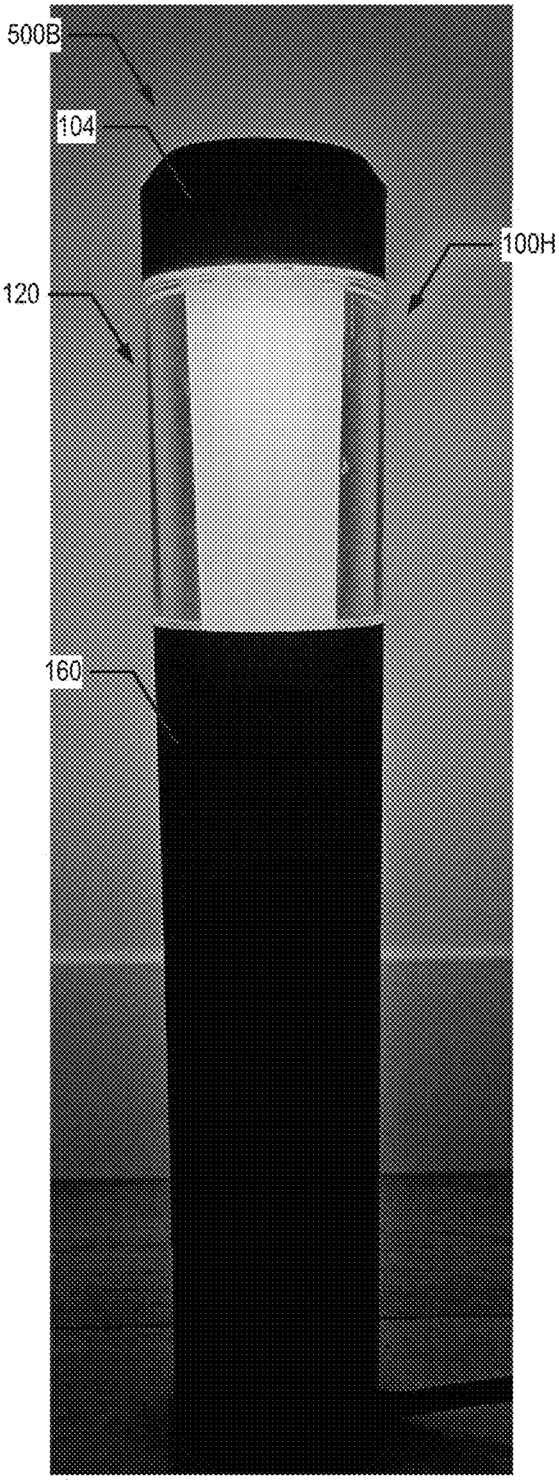
Figures 16C, 16D:
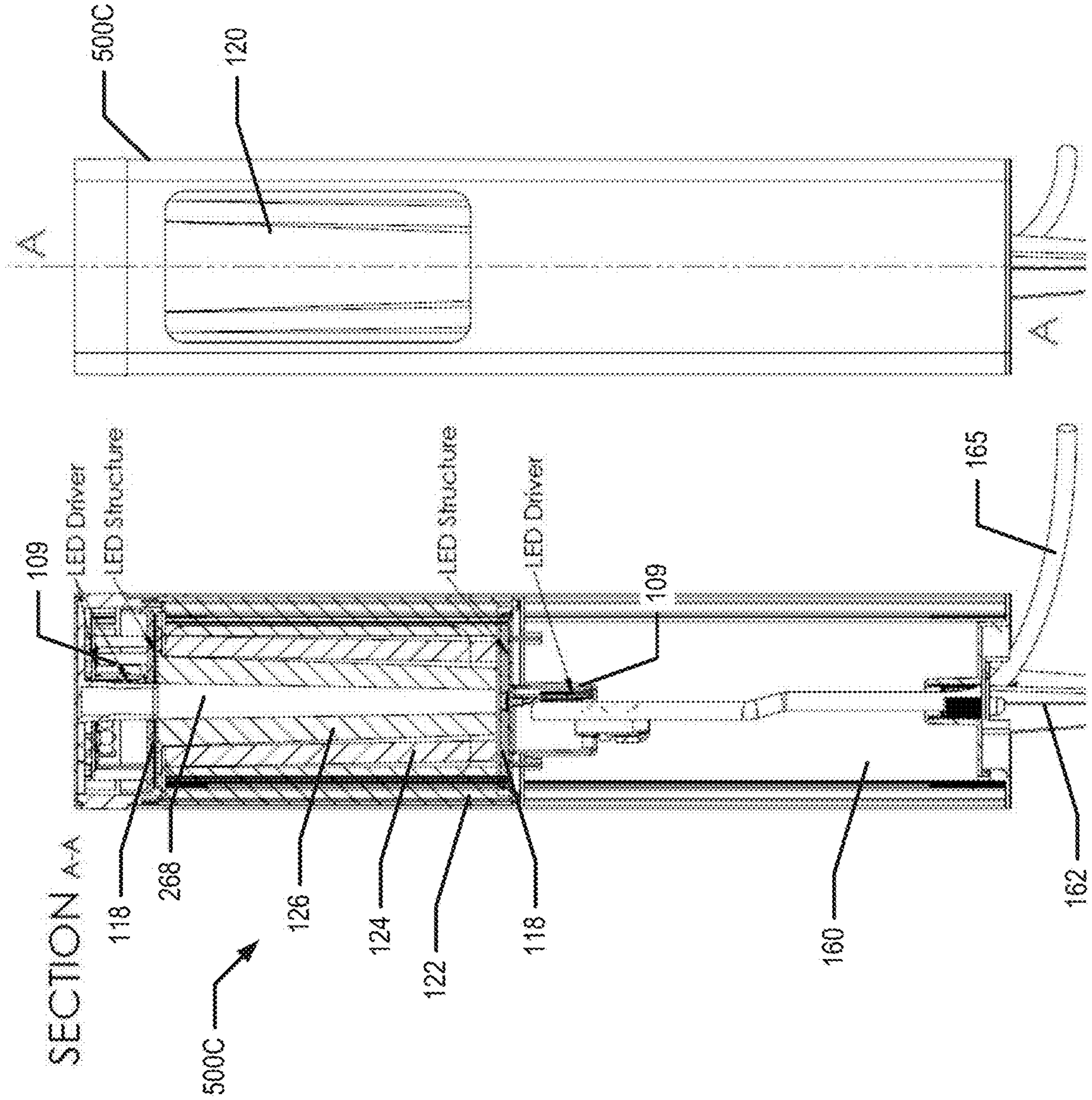
Figure 17A:
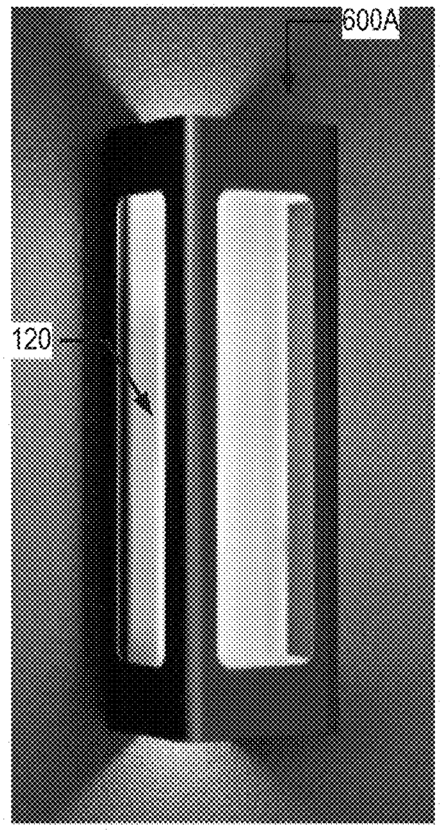
Figure 17B:
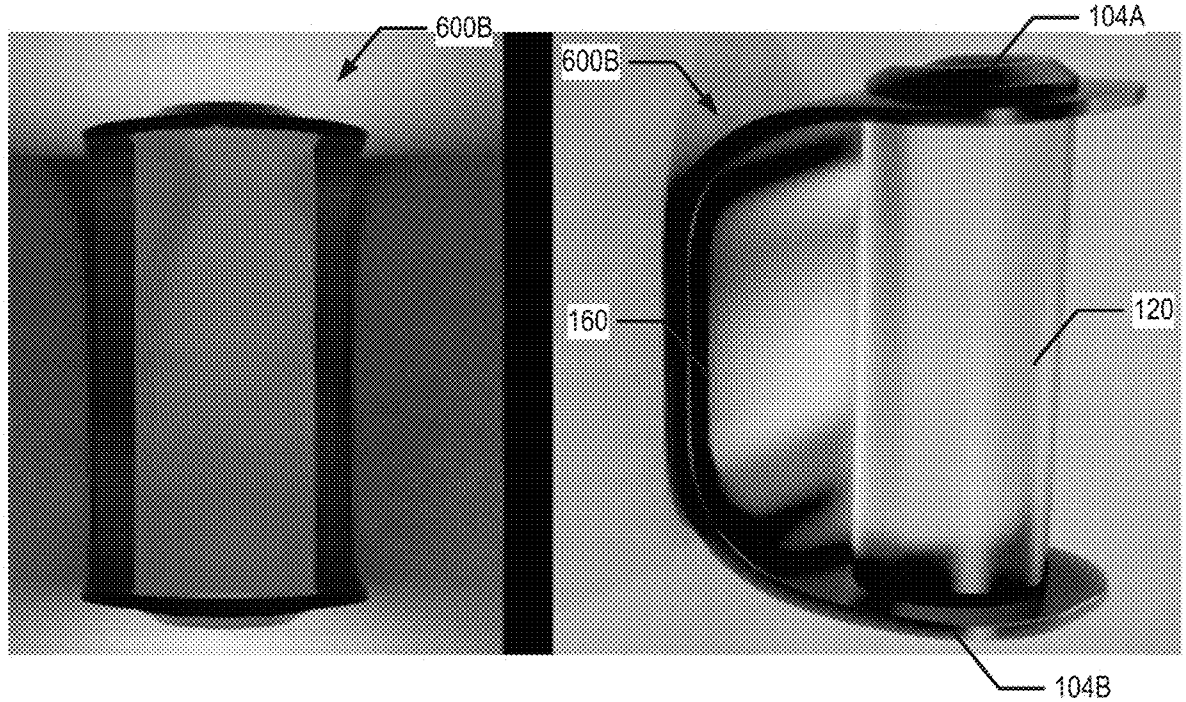
Figure 17C:
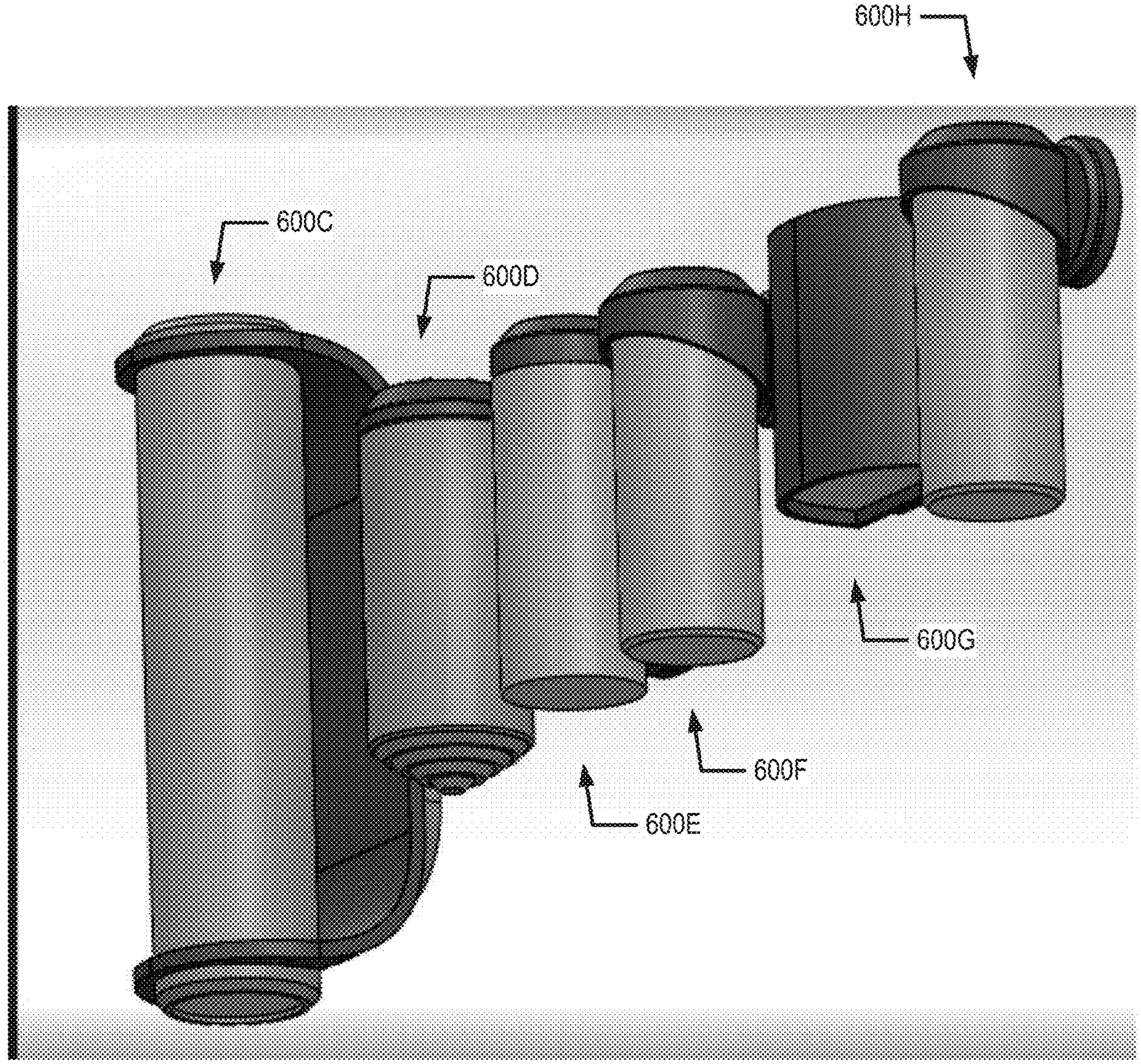
Figure 18:
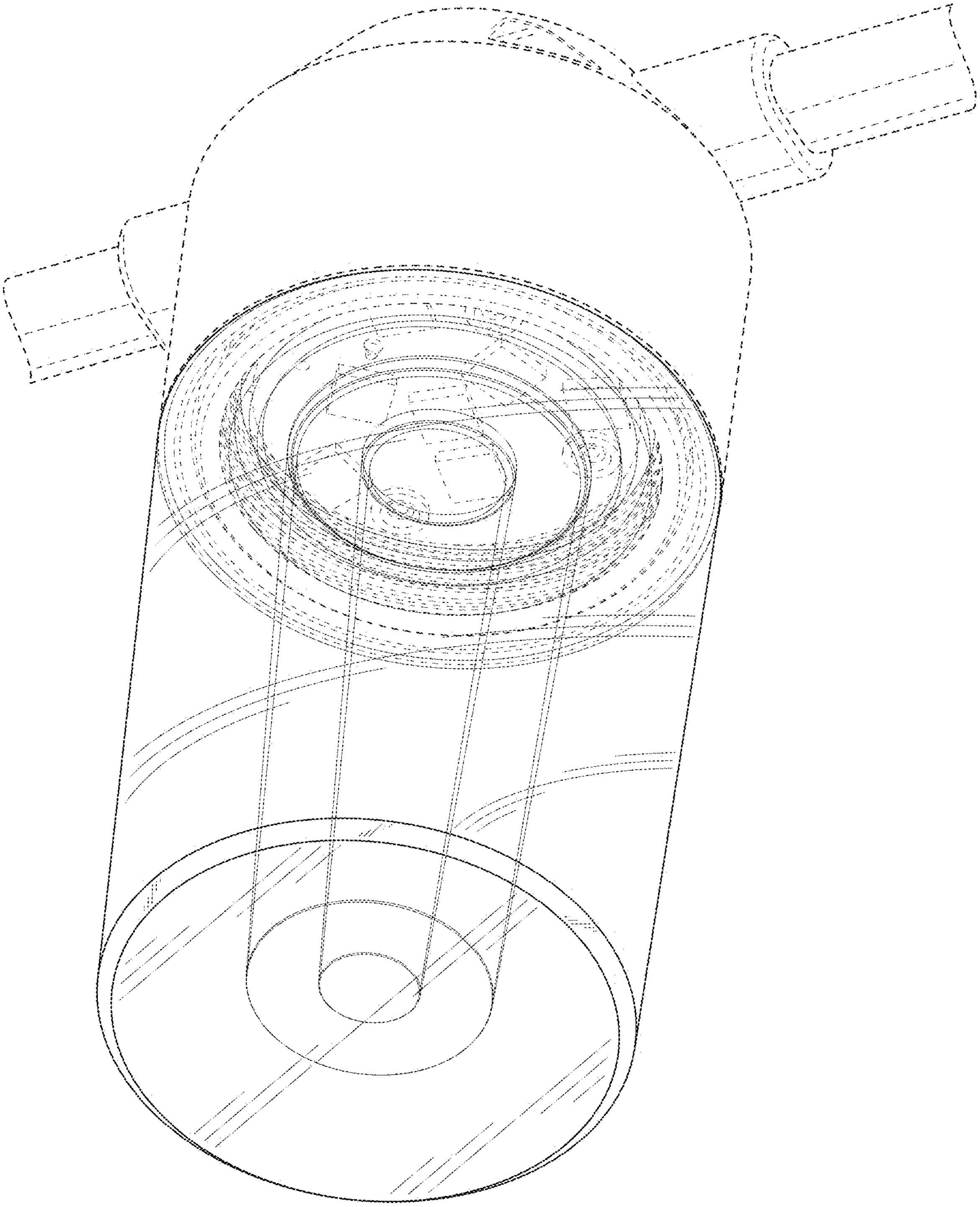
Figure 19:
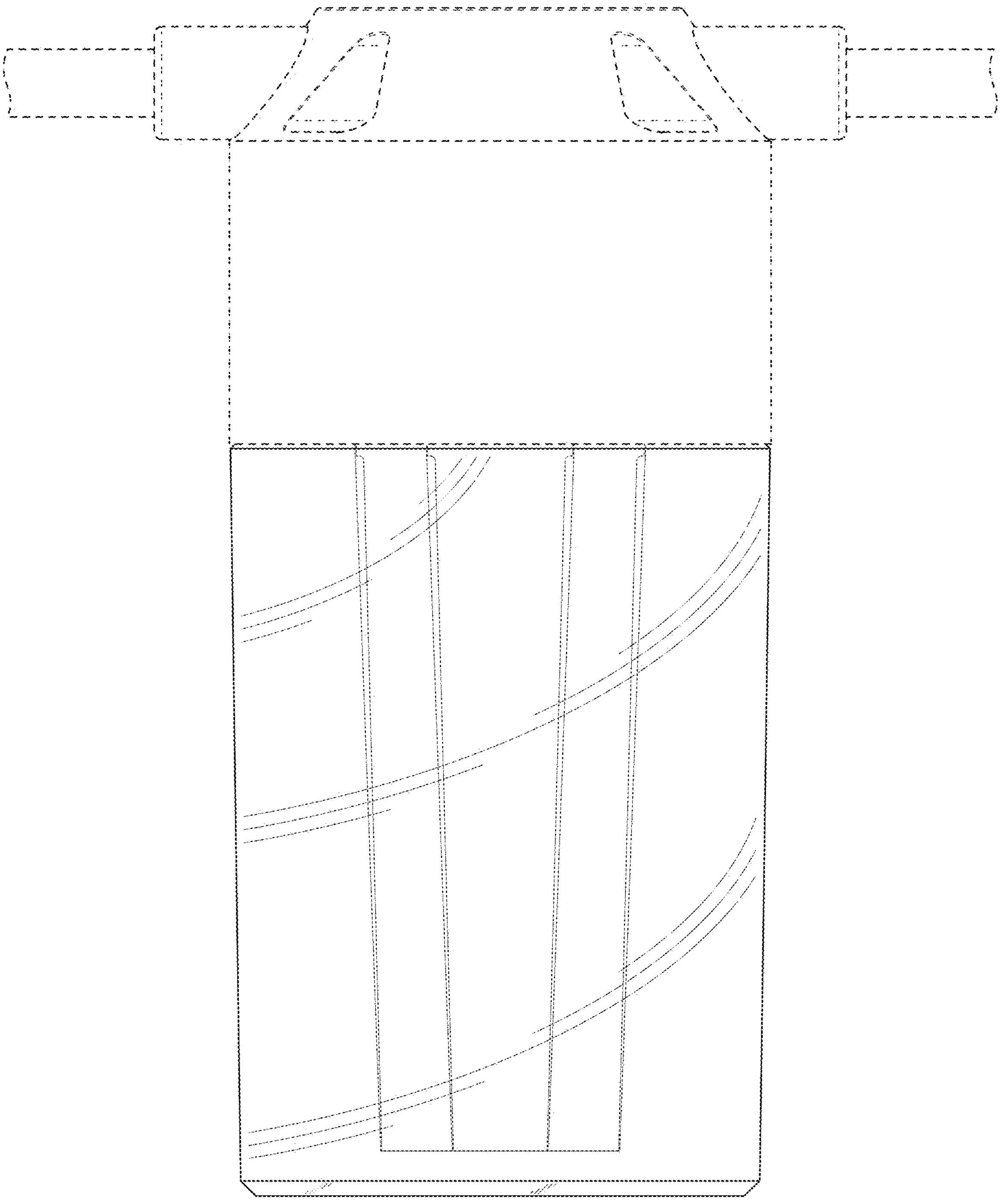
Figure 20:
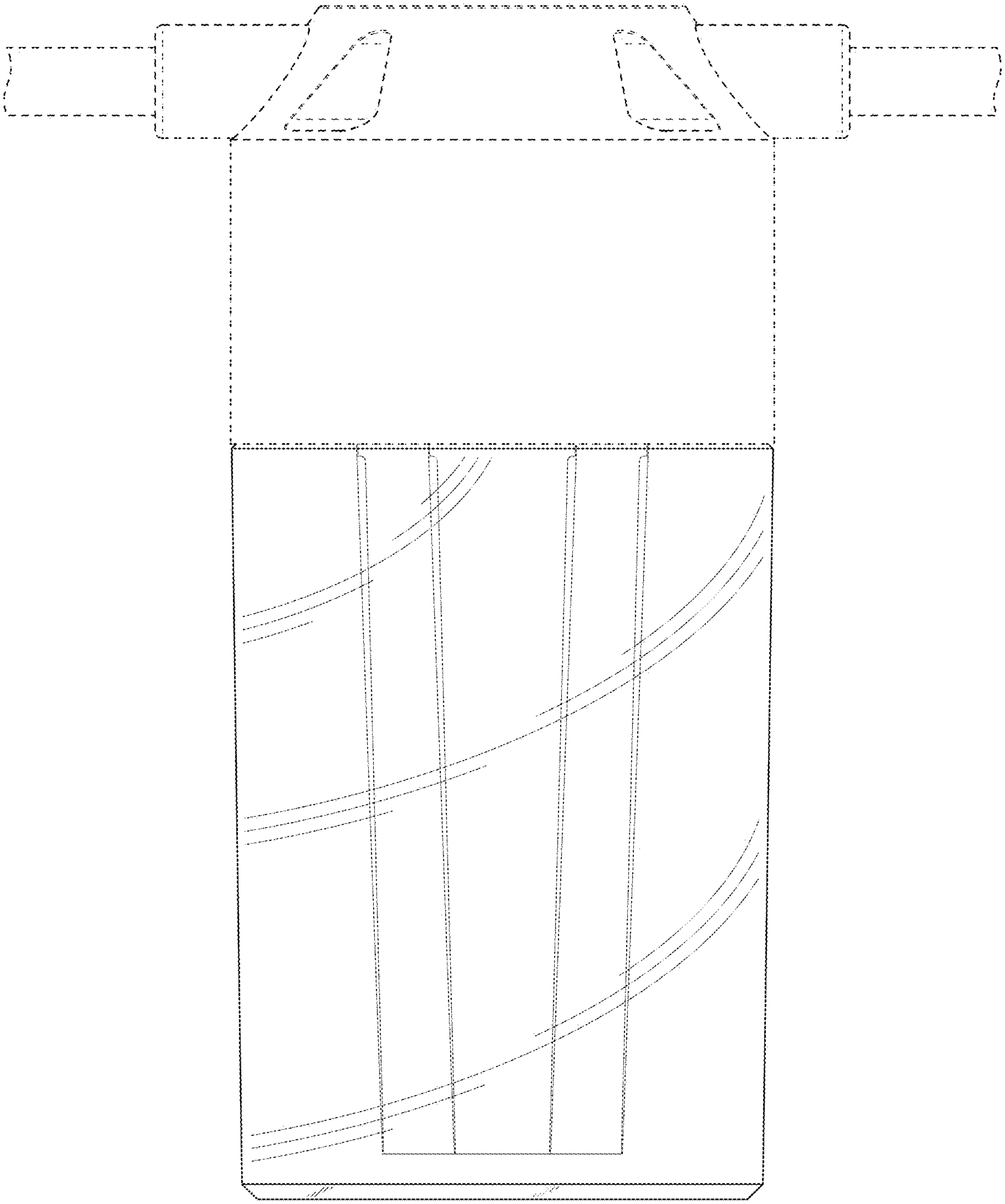
Figure 21:
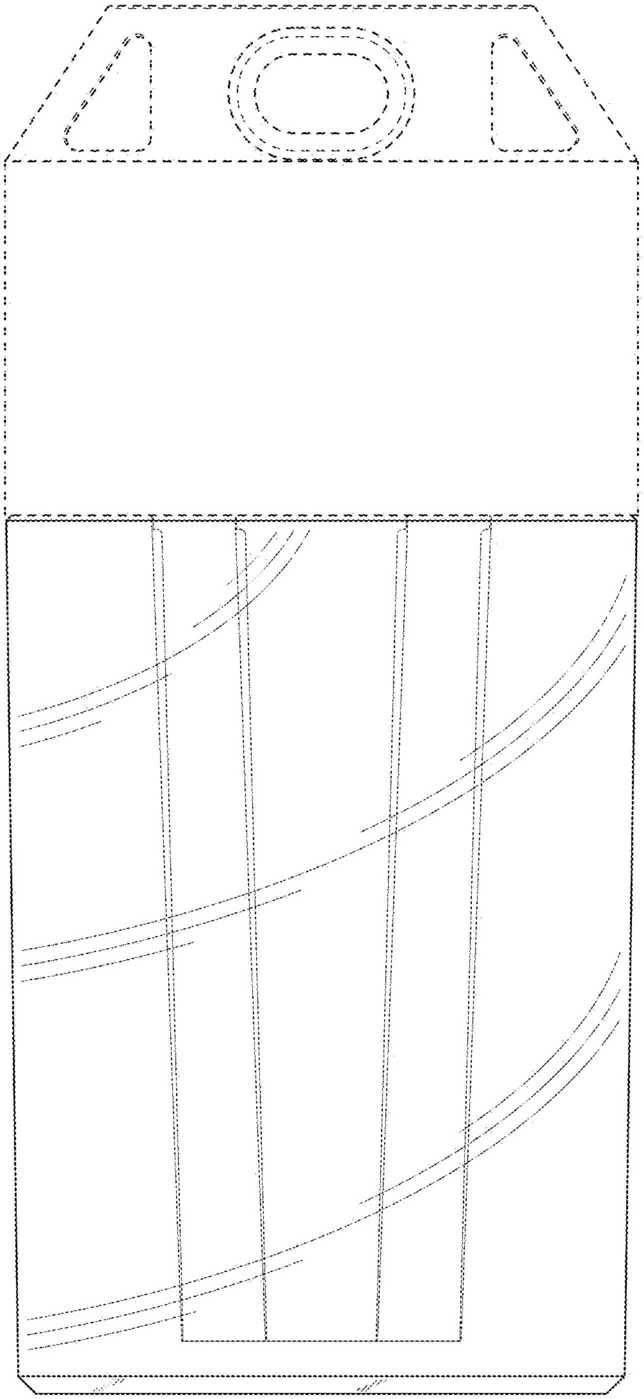
Figure 22:
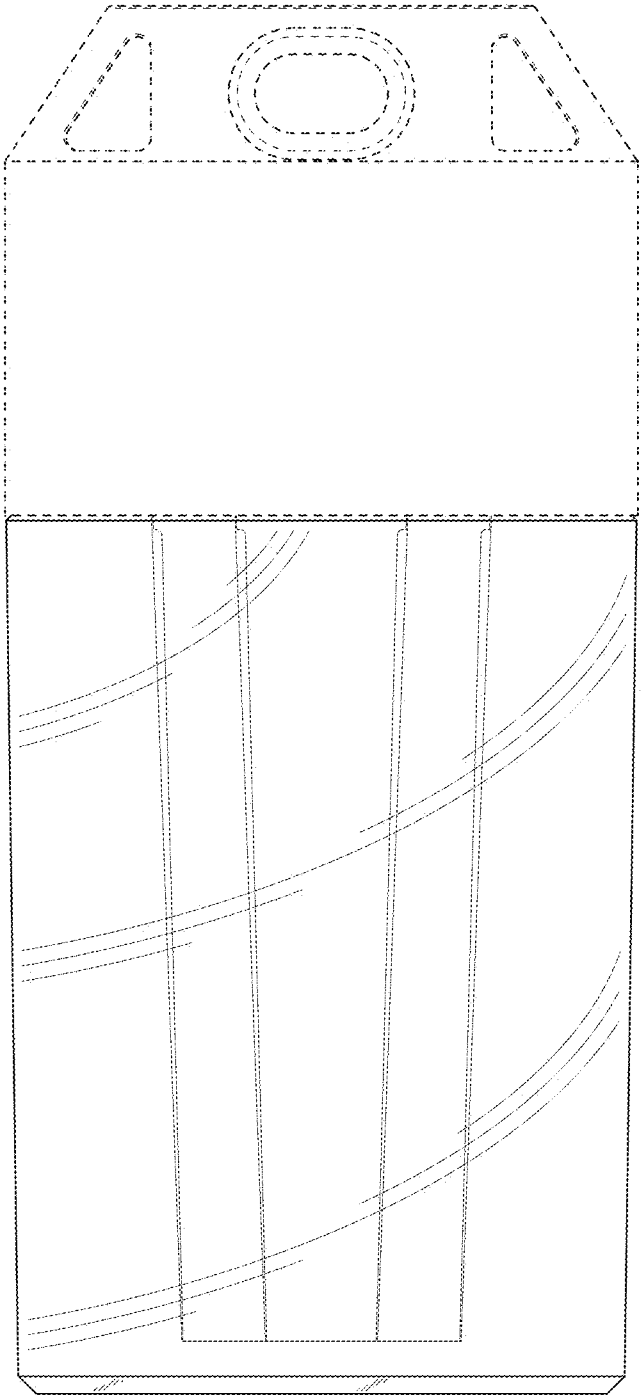
Figure 23:
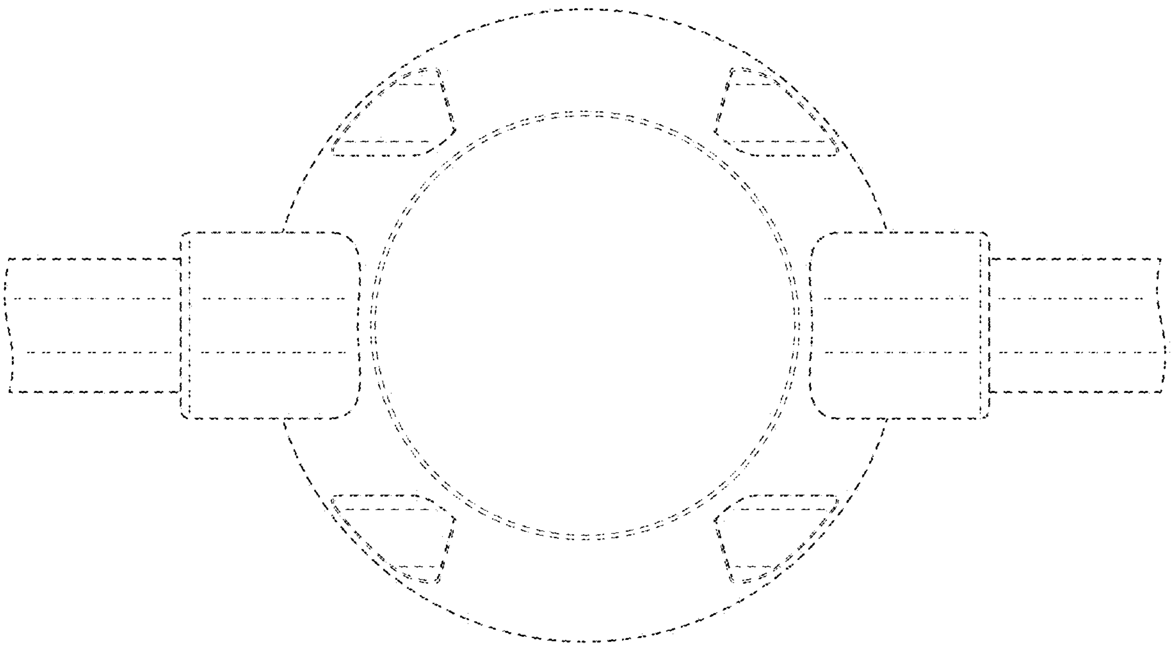
Figure 24:
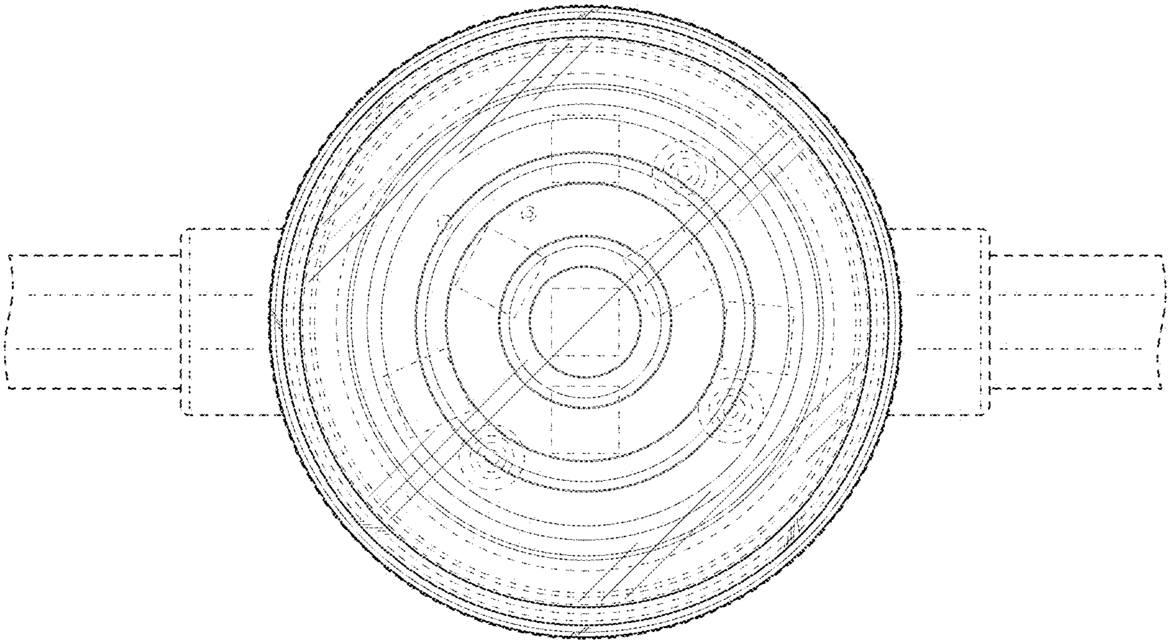
Figure 25:
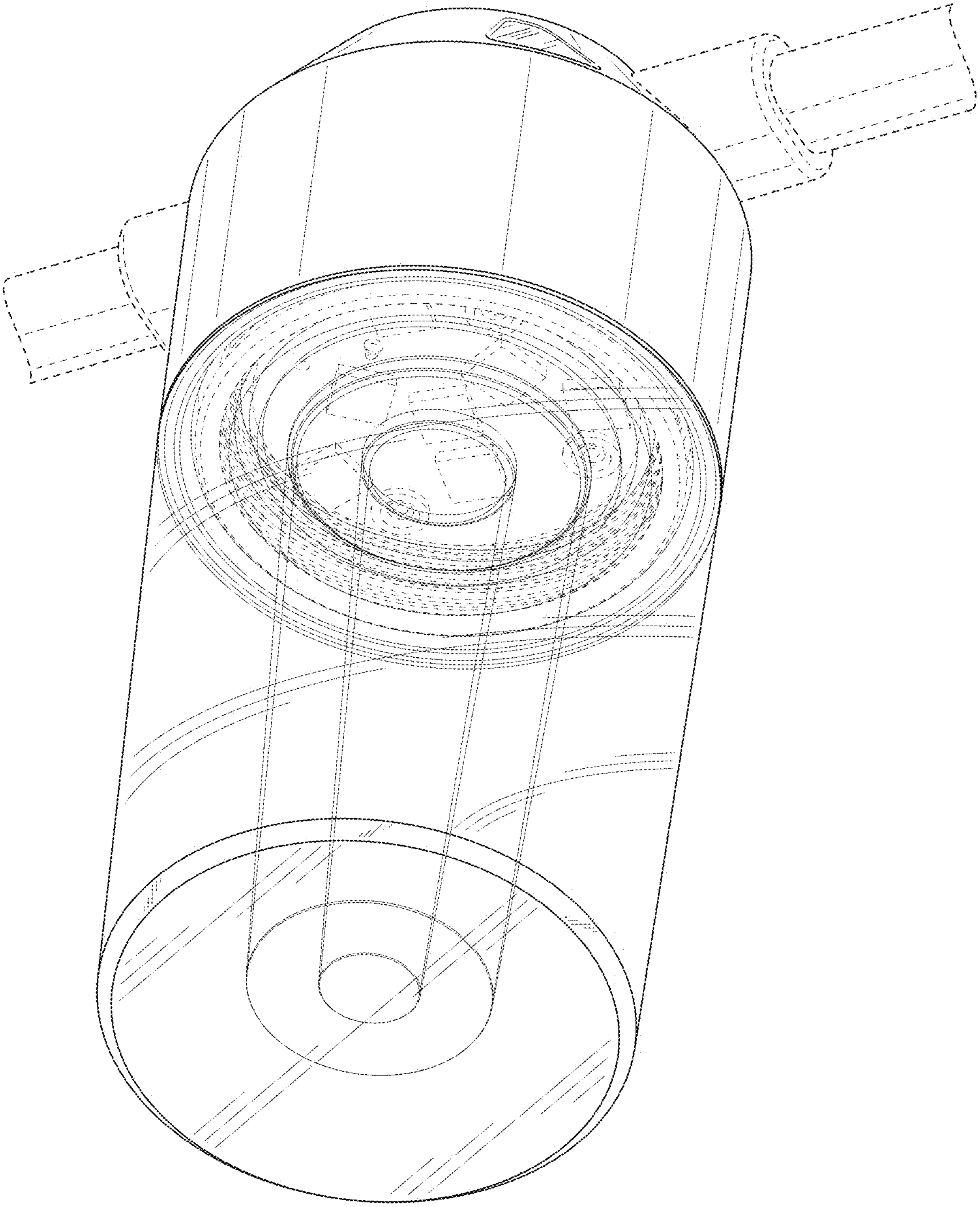
Figure 26:
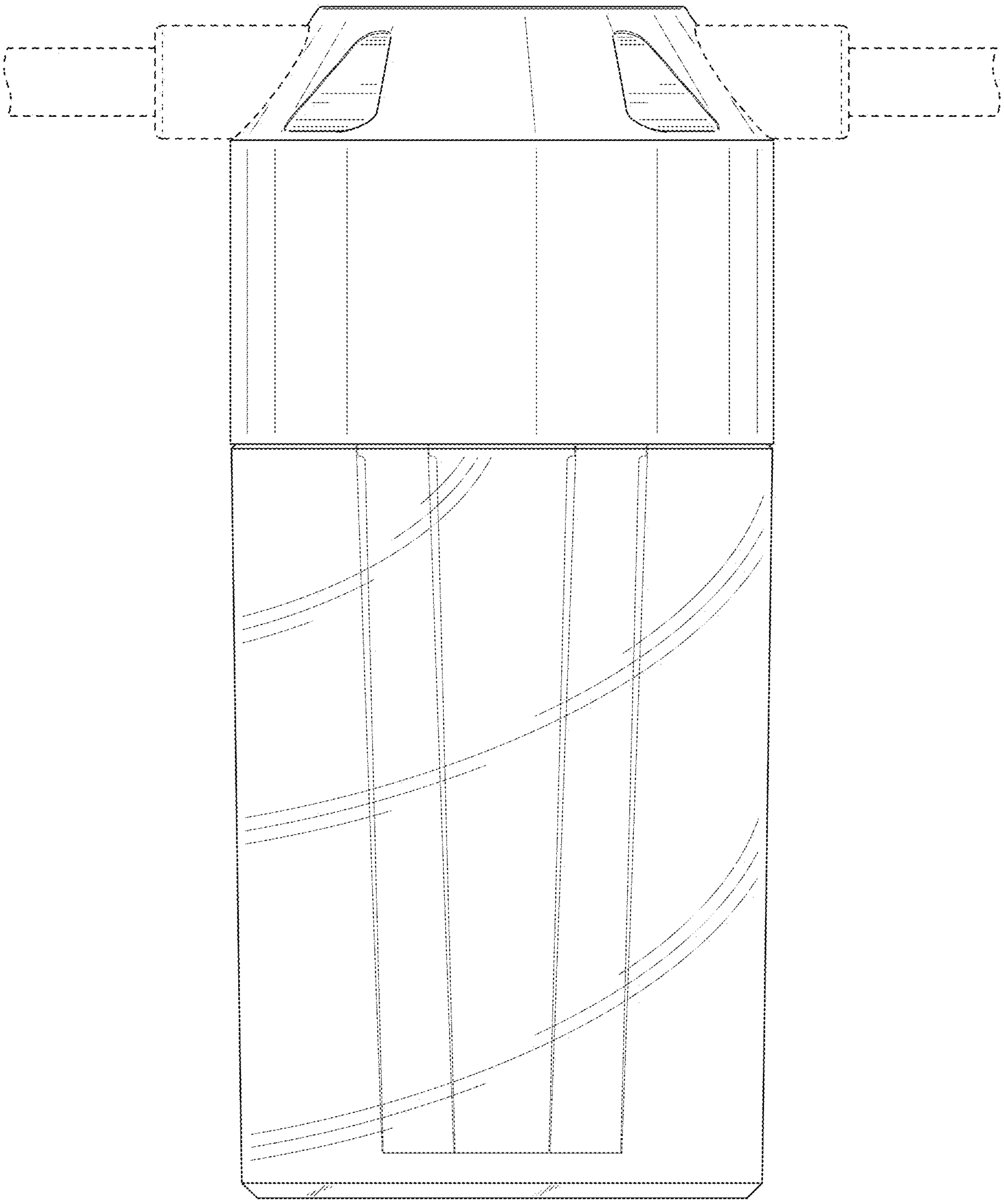
Figure 27:
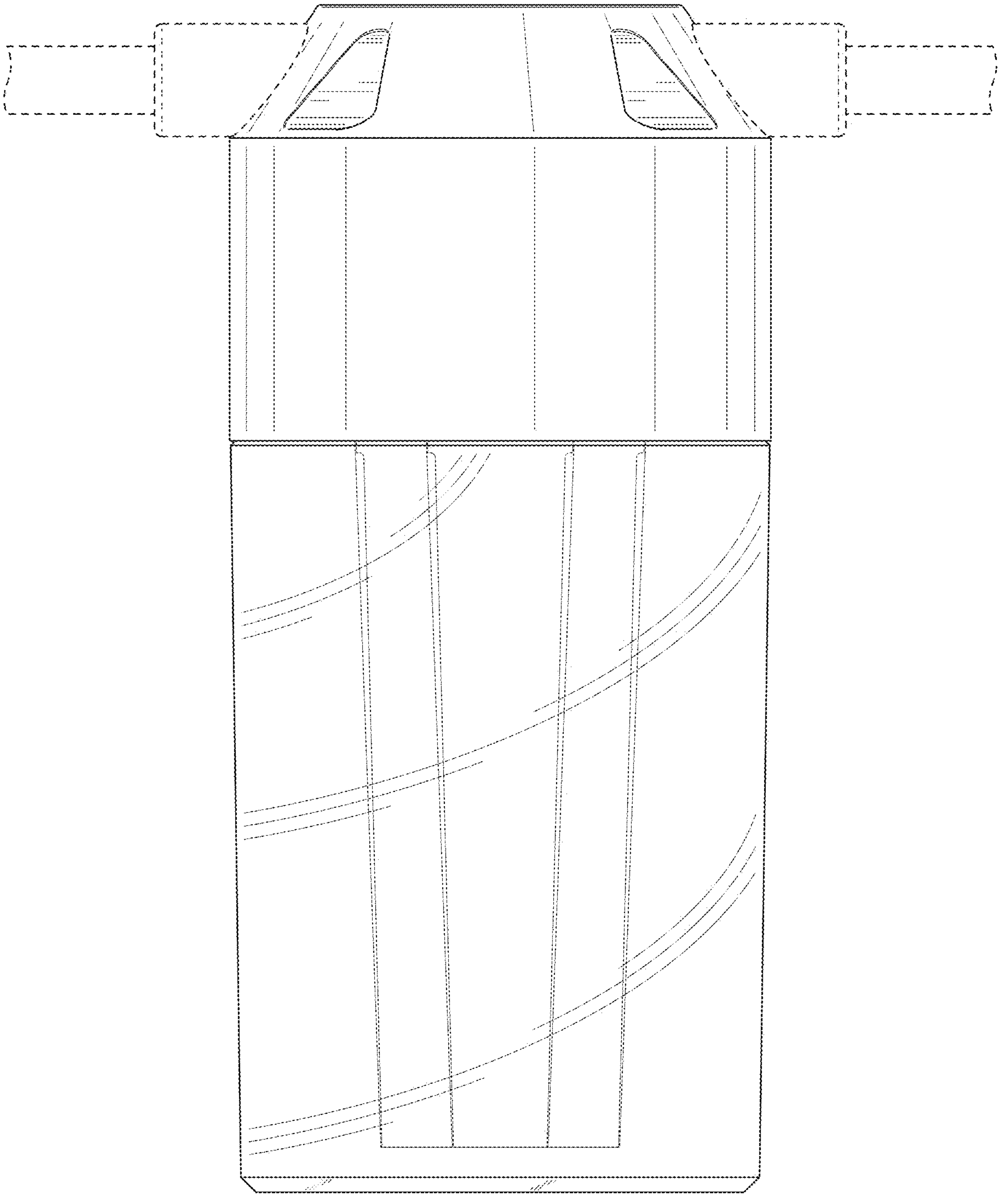
Figure 28:
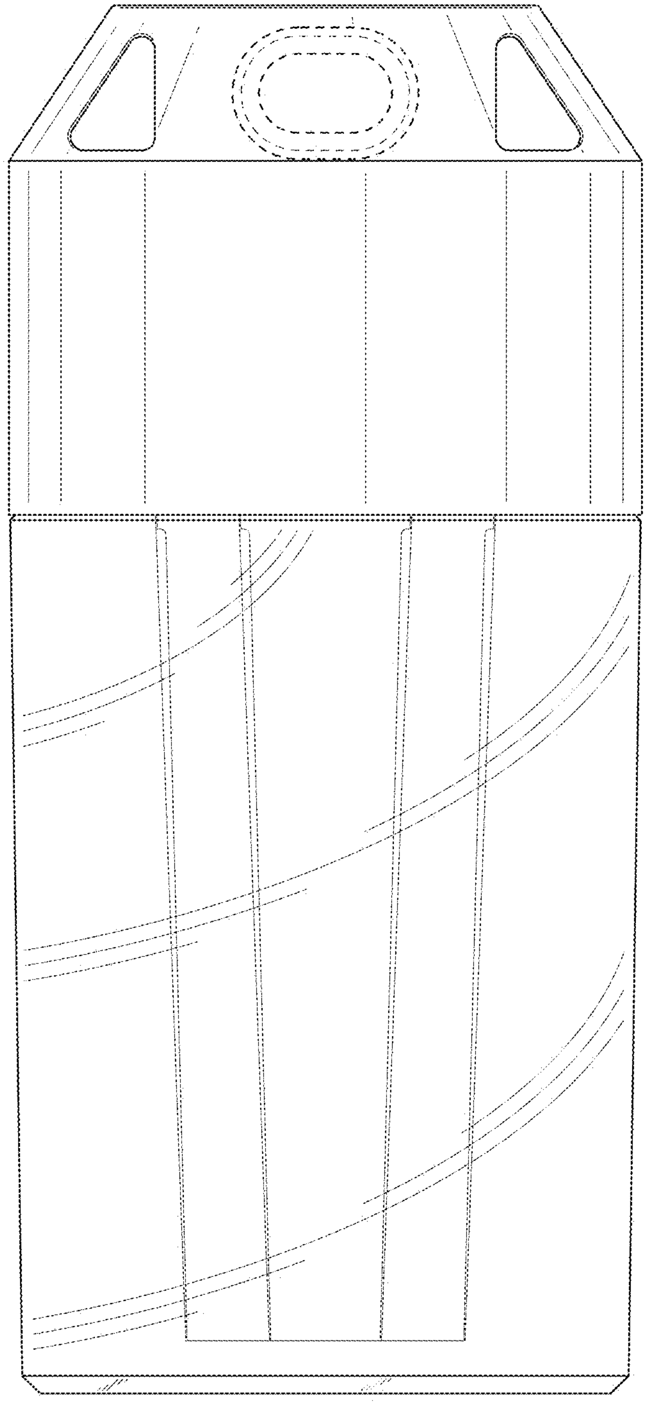
Figure 29:
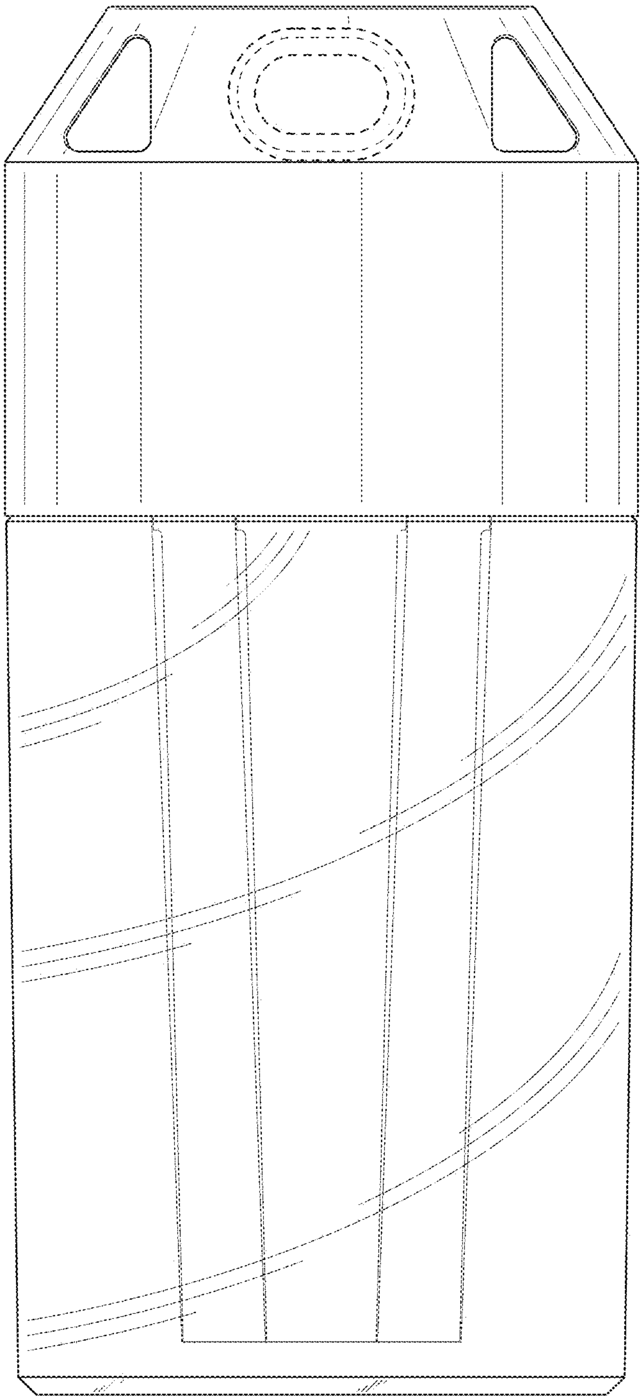
Figure 30:
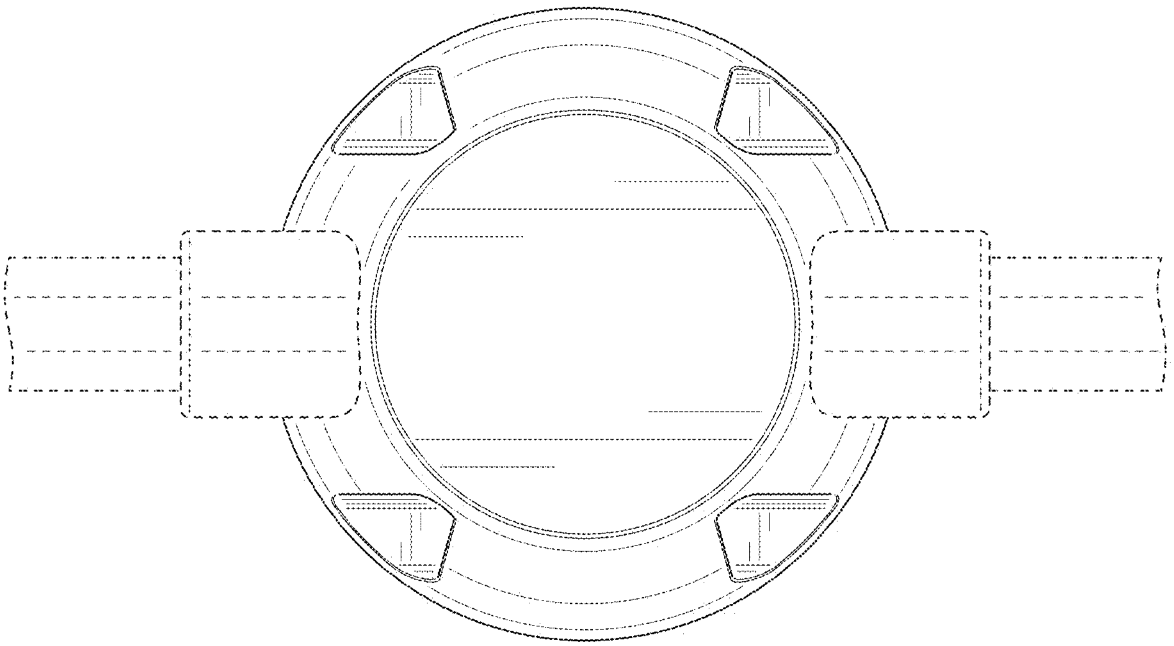
Figure 31:
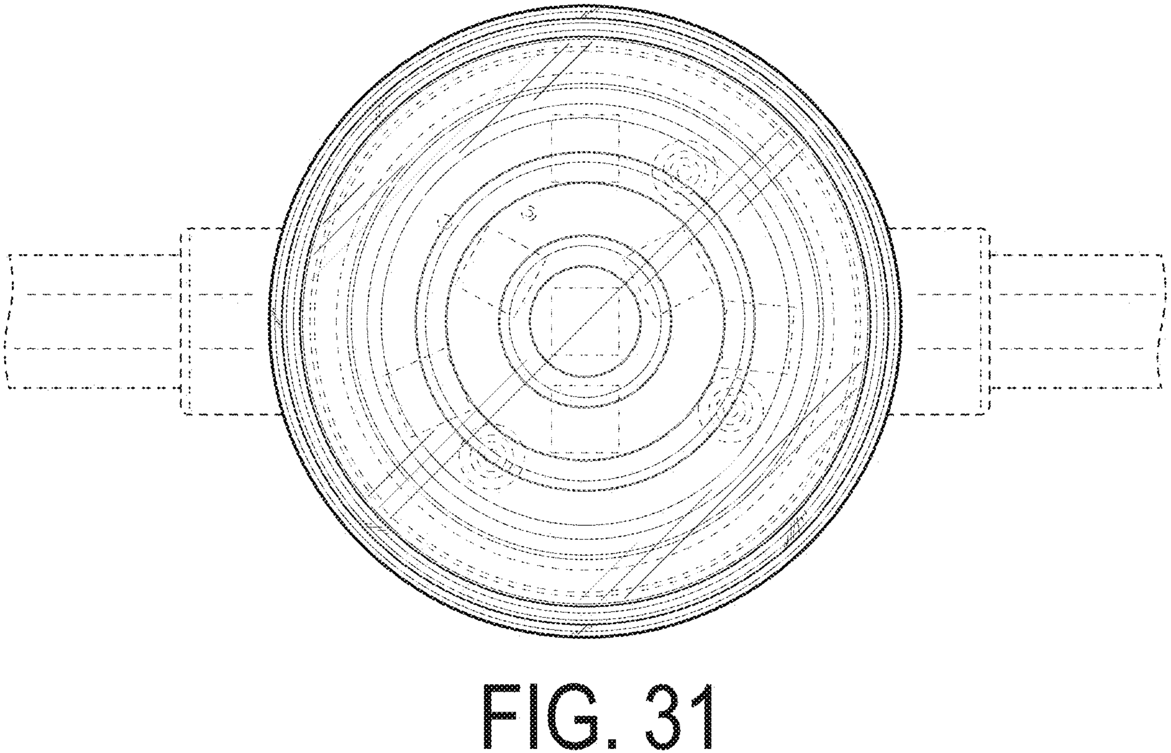
Figure 32:
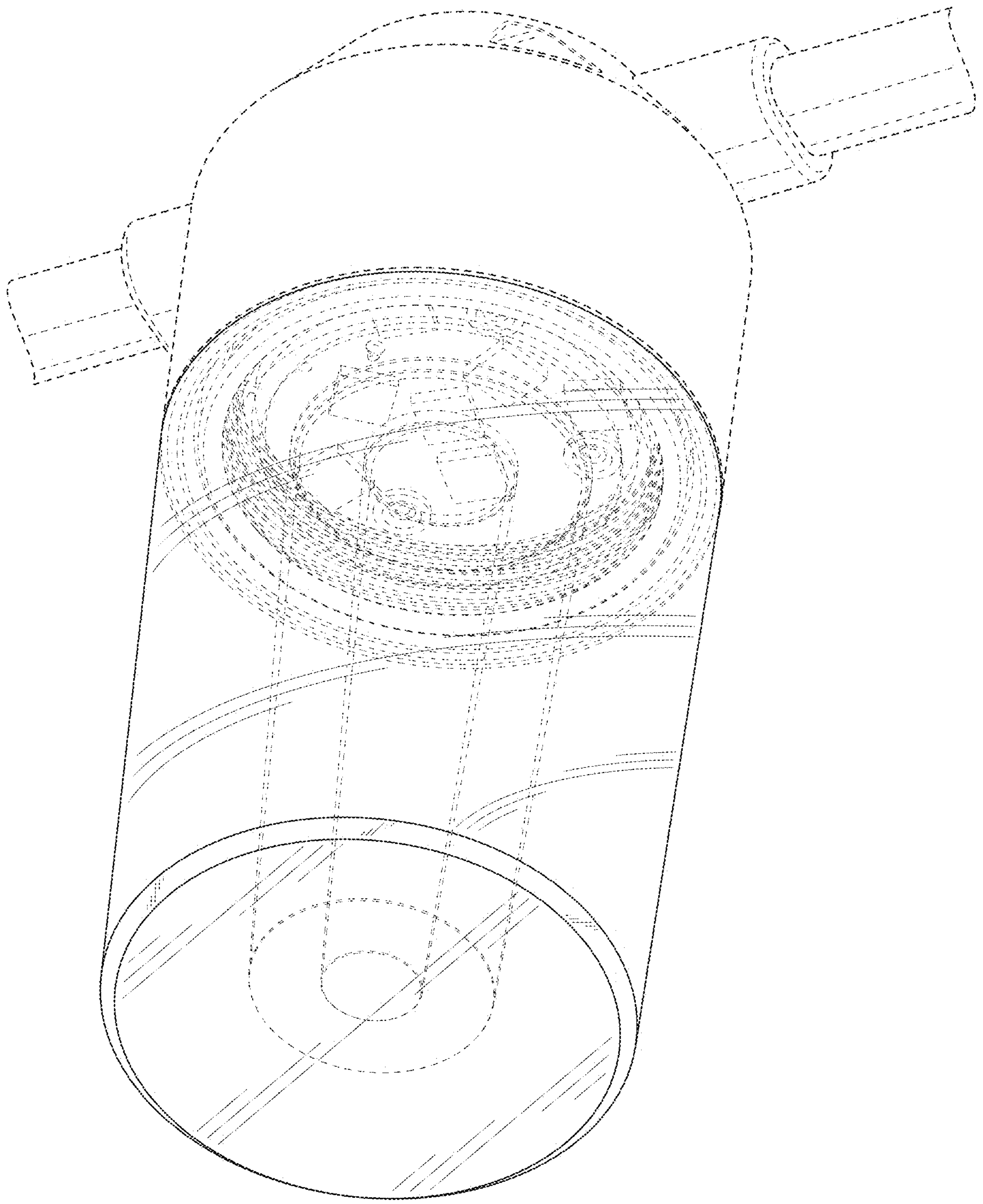
Figure 33:
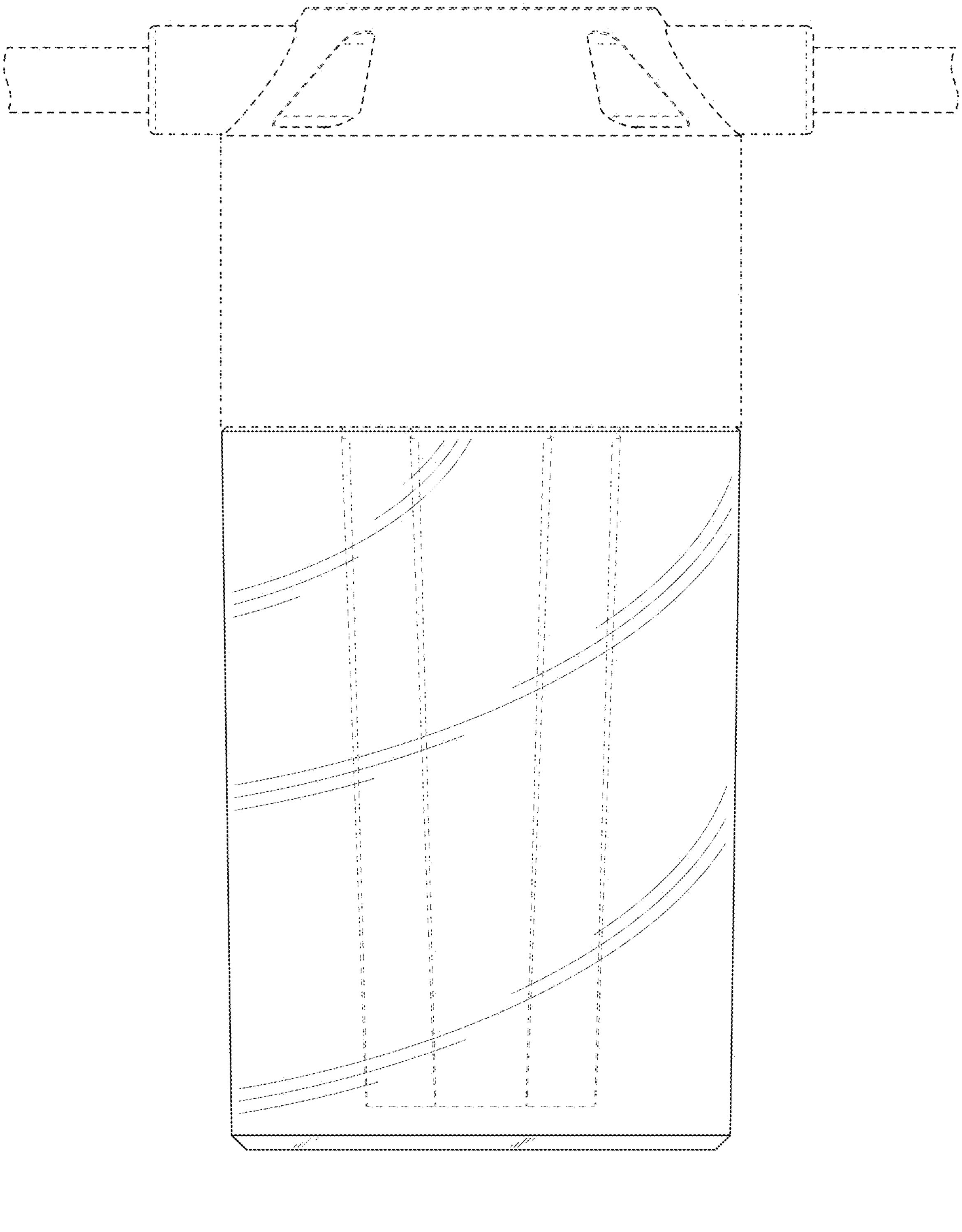
Figure 34:
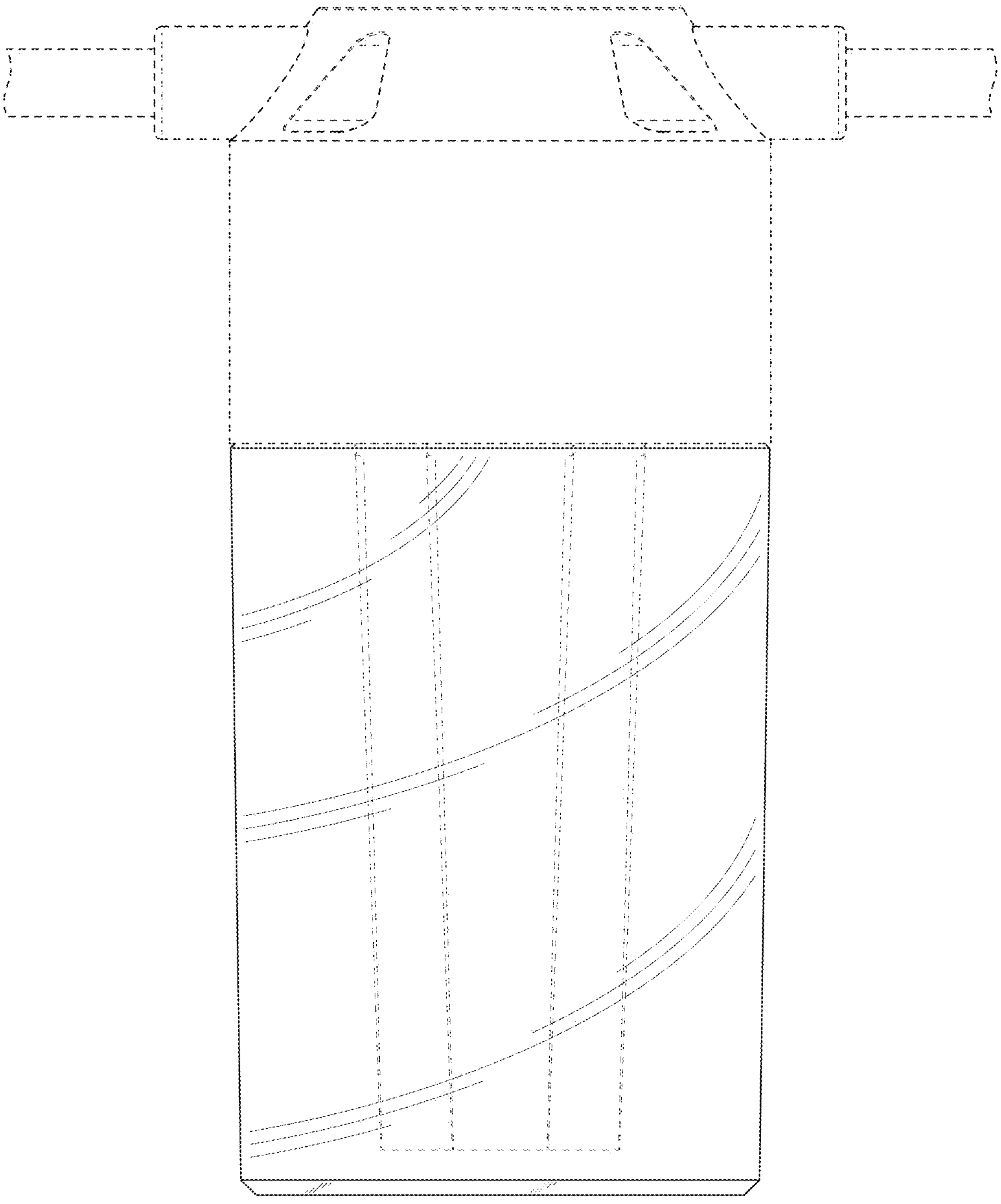
Figure 35:
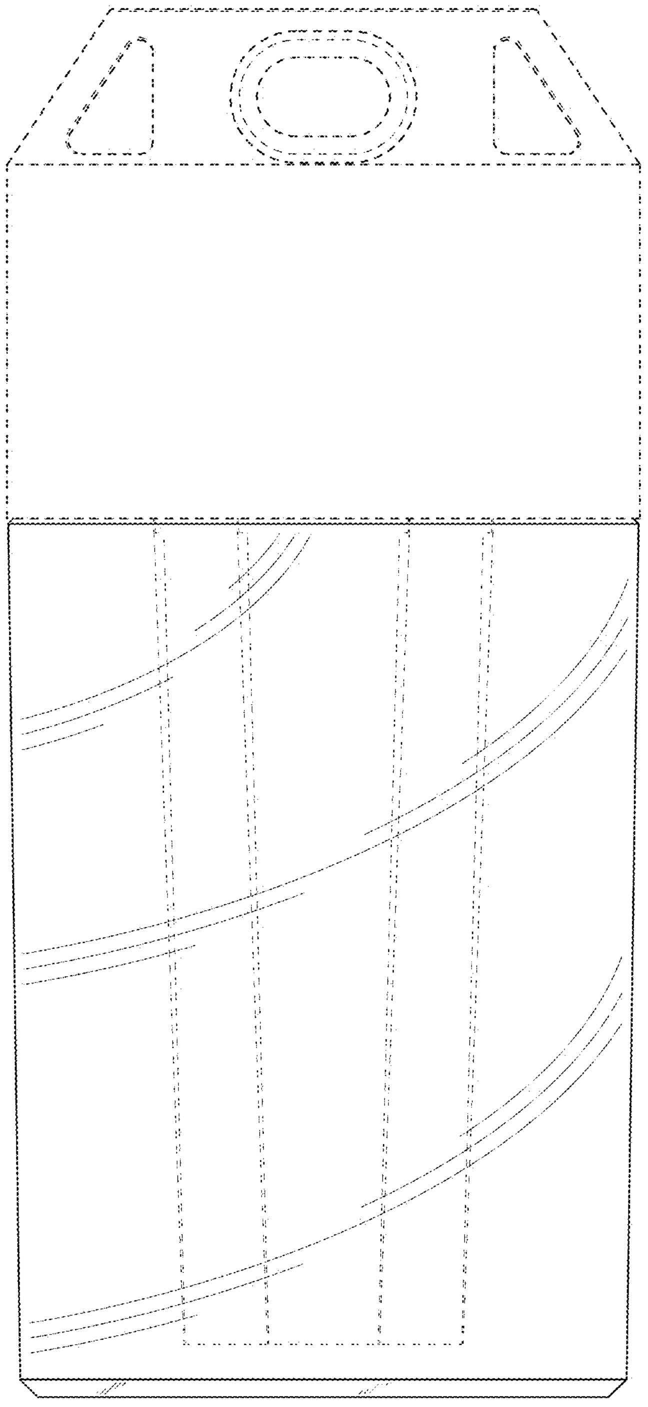
Figure 36:
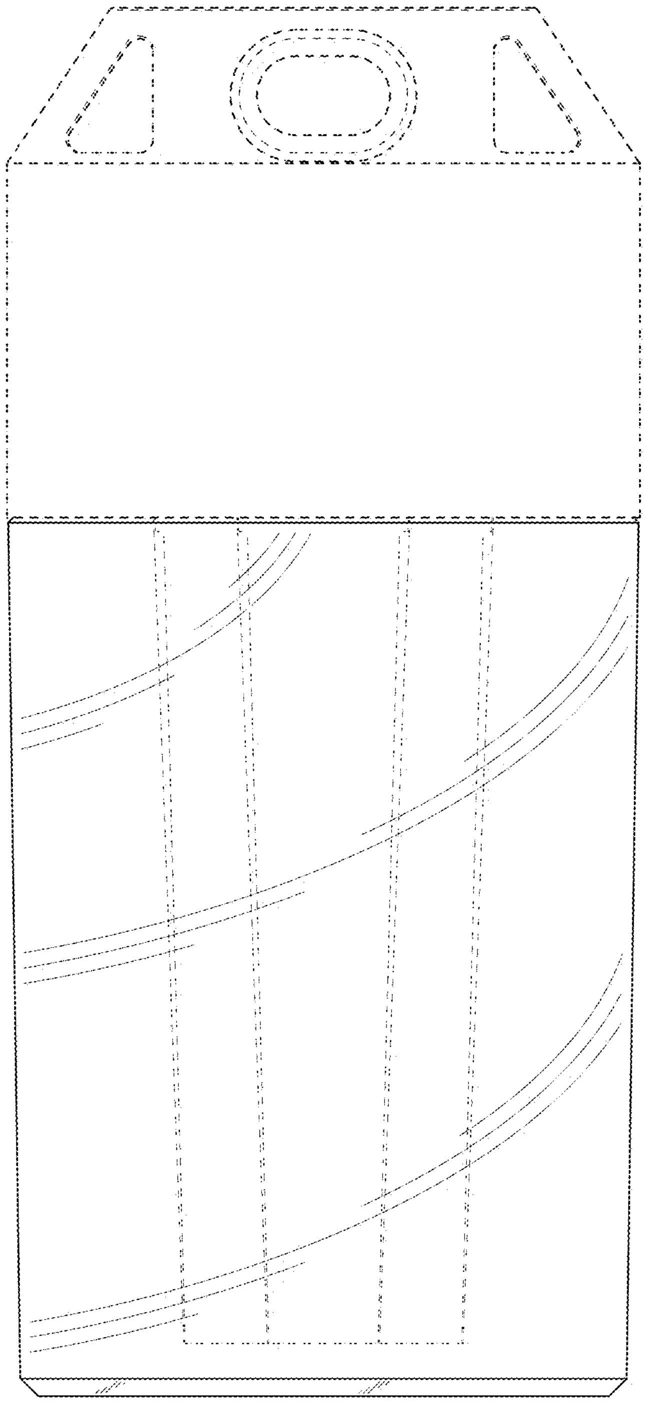
Figure 37:
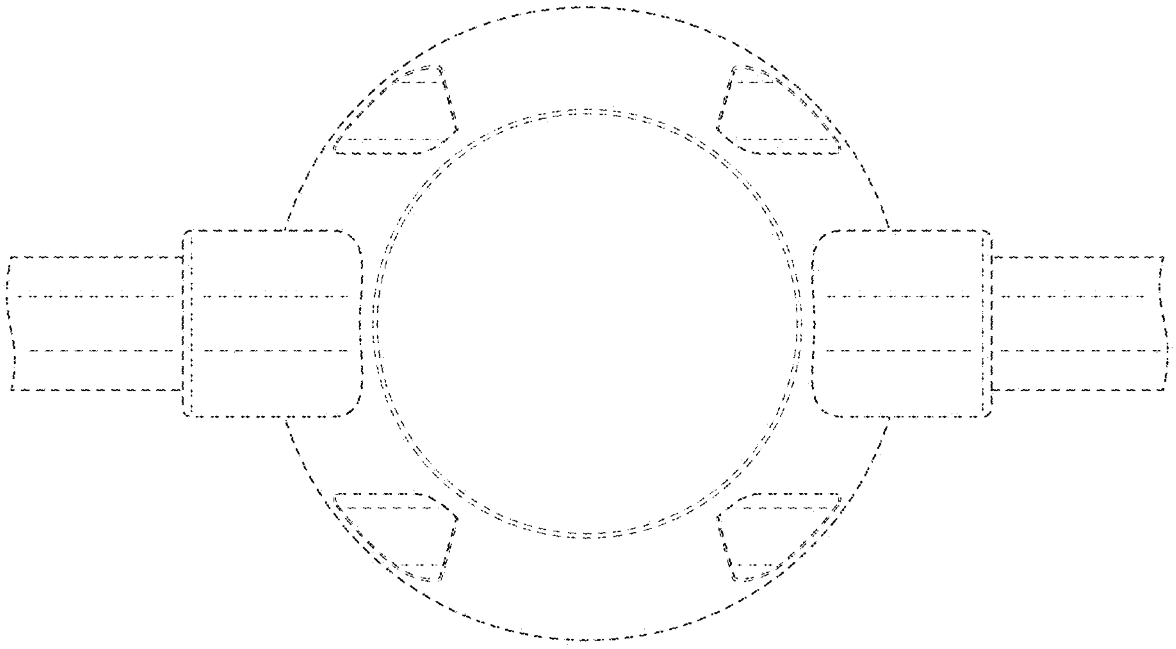
Figure 38:
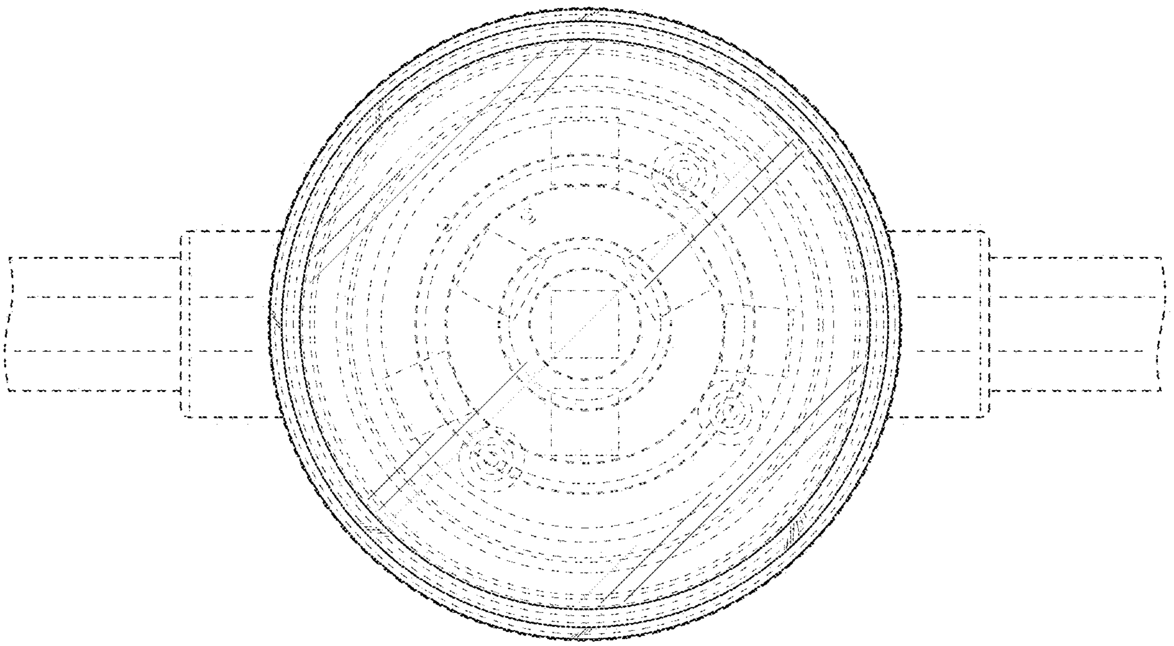

FIG. 12A provides perspective views of individual optical elements of an optical assembly, according to an example embodiment;

FIG. 12B provides a top view of the individual optical elements shown in FIG. 12A;

FIG. 12C provides a cross-sectional view along the B-B line shown in FIG. 12B;

FIG. 13A provide a partial cross-section of an example optical assembly taken in a plane including the optical axis of the LED lamp, in accordance with various embodiments of the present disclosure;

FIG. 13B illustrates an example perspective view of the optical assembly of FIG. 13A, in accordance with various embodiments of the present disclosure;

FIG. 13C provides another partial cross-section of an example optical assembly taken in a plane including the optical axis of the LED lamp, in accordance with various embodiments of the present disclosure;

FIGS. 14A, 14B, 14C, and 14D provide various perspective views of example LED lamps, in accordance with various embodiments of the present disclosure;

FIG. 15 provides perspective views of five example embodiments of LED lamps, in accordance with various embodiments of the present disclosure;

FIGS. 16A, 16B, and 16D illustrate example lighting devices configured as path lights and including an LED lamp, in accordance with various embodiments of the present disclosure;

FIG. 16C illustrates a cross-sectional view of the lighting device shown in FIG. 16D, in accordance with various embodiments of the present disclosure;

FIGS. 17A, 17B, and 17C illustrate example lighting devices configured as sconces and including and LED lamp, in accordance with various embodiments of the present disclosure; and FIGS. 18-38 provide perspective views, left side views, right side views, front side views, back side views, top views, and bottom views, respectively, of various embodiments of LED lamps.

DETAILED DESCRIPTION OF VARIOUS EMBODIMENTS

The present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," "bottom," etc. are used for explanatory purposes in the examples provided below to describe the relative positions of certain components or portions of components. As used herein, the term "or" is used in both the alternative and conjunctive sense, unless otherwise indicated. The term "along," and similarly utilized terms, means near or on, but not necessarily requiring directly on an edge or other referenced location. The claimed invention may be used in any orientation.

As used herein, terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present disclosure. As used in the specification and the appended claims, the singular form of "a," "an," and "the" include plural references unless otherwise stated. The terms "includes" and/or "including," when used in the specification, specify the presence of stated feature, elements, and/or components; it does not preclude the presence or addition of one or more other features, steps, operations, elements, components, and/or groups thereof.

As used herein, the phrases "in one embodiment," "in example embodiments," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment. As used herein, the terms “example,” “exemplary,” and the like are used to “serving as an example, instance, or illustration.” Any implementation, aspect, or design described herein as “example” or “exemplary” is not necessarily to be construed as preferred or advantageous over other implementations, aspects, or designs. Rather, use of the terms “example,” “exemplary,” and the like are intended to present concepts in a concrete fashion.

Aspects of the present disclosure may be implemented as computer program products that comprises articles of manufacture. Such computer program products may include one or more software components including, for example, applications, software objects, methods, data structure, and/or the like. A software component may be coded in any of a variety of programming languages. An illustrative programming language may be a lower-level programming language such as an assembly language associated with a particular hardware architecture and/or operating system platform/system.

As should be appreciated, various aspects of the present disclosure may also be implemented as methods, apparatuses, systems, computing devices, computing entities, and/or the like. As such, aspects of the present disclosure may take the form of a data structure, apparatus, system, computing device, computing entity, and/or the like executing instructions stored on a computer-readable storage medium to perform certain steps or operations. Thus, aspects of the present disclosure may also take the form of an entirely hardware aspect, an entirely computer program product aspect, and/or an aspect that comprises combination of computer program products and hardware performing certain steps or operations.

The figures are provided to illustrate some examples of the disclosure described. The figures are not to limit the scope of the present embodiment of the disclosure or the appended claims. Aspects of the example embodiment are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

Example embodiments described herein generally relate to an LED lamp or an LED lighting device including one or more LED packages, that includes an optical assembly configured for controlling optical effects of light emitted by the LED lamp or LED lighting device. In various embodiments, the optical assembly of an LED lamp is configured such that the operating light aspects or qualities (e.g., brightness, color temperature, color, and/or the like of the light emitted by the LED lamp or LED lighting device when the LED lamp or LED lighting device is being operated and/or is turned on), selectively allows one or more emitted colors to diffuse through one or more optical element. For example, example embodiments of the present invention described herein generally relate to LED lamps or LED lighting devices wherein the diffusing of different color of lights is configurable with one or more optical elements comprising diffusing particles and/or structures. For example, the LED lamp of an example embodiment allows for the creation of unique and/or dynamic lighting effects achievable through two or more sets of LED packages and an optical assembly comprising at least two optical elements. However, it should be understood that principles of the present invention may be used to provide an LED lamp or LED lighting device for which one or more colors emitted by the LED lamp or LED lighting device may diffuse through one or more optical elements of an optical assembly.

For example, the present invention may provide an LED lamp or an LED lighting device including one or more LED lamps, having optical elements configured to diffuse various colors of light emitted by one or more sets of LED packages, wherein the one or more sets of LED packages each comprise a respective at least one LED package. For example, the LED lamp may comprise an optical assembly, wherein the optical assembly comprises at least two optical elements. In various embodiments, the at least two optical elements may be cylinders, truncated cones, and/or the like. In various embodiments, the at least two optical elements may have different shapes. The optical elements respectively comprise diffusing particles and/or structures, wherein the diffusing particles and/or structures are disposed within the material of the optical element, in various embodiments. In other embodiments, a surface treatment is applied to the inner and/or outer surface of one or more of the optical elements. In an example embodiment, diffusing particles and/or structures are configured to be a surface treatment of the optical element. For example, a first optical element may comprise a first diffusing particle and/or structure, wherein the first diffusing particle and/or structure is configured to assist in diffusing a first color (e.g., red, green, blue, and/or the like). The optical assembly may further comprise one or more additional optical elements disposed within the outermost surface of the first optical element, wherein the one or more additional optical elements comprise one or more additional diffusing particles and/or structures. The one or more additional diffusing particles and/or structures may be configured to diffuse one or more additional colors.

LEDs and/or LED packages may be manufactured that emit light at a variety of colors, color temperatures, brightness, and/or the like. Moreover, LEDs may be configured to emit light at a variety of brightness, patterns, and/or having other configurable light aspects or qualities. Embodiments of the present invention allow a user to take advantage of the variety of light aspects or qualities at which LEDs may emit light by allowing the user to operate an LED lamp or LED lighting device by creating a layered coloring effect as a result of a respective optical element being configured to control dispersion of light emitted by a respective set of LEDs and/or LED packages. For example, in an example embodiment, a respective set of LEDs and/or LED packages comprises LEDs and/or LED packages configured to emit light of a particular color or light quality and the corresponding optical element is configured to disperse light of the particular color or light quality in a particular manner. In an example embodiment, a plurality of sets of LEDs and/or LED packages, with each set of LEDs and/or LED packages configured to emit light having a respective color or light quality, are arranged concentrically and the optical assembly includes a concentric structure of optical elements such that each optical element control light dispersion for a respective set of LEDs and/or LED packages (e.g., for light of a particular color and/or light quality). For example, the optical elements of the optical assembly may be disposed concentrically around the optical axis of the optical assembly and/or LED lamp.

Various embodiments of the present invention allow a user to take advantage of the variety of colors which LEDs may emit light by allowing the user to select the emitted light qualities of an LED lamp or LED lighting device. For example, the user may be able to switch between optical assemblies configured to disperse different colors of light in different manners and/or patterns to cause the LED lamp or LED lighting device to provide light having different light qualities. For example, the user may be able to change the operating color, color temperature, brightness, etc. of the LED lamp or LED lighting device as the user desires during the operation of the LED lamp or LED lighting device. The user may also choose to select a programmable operating light quality for the LED lamp or LED lighting device. For example, the LED lighting device or LED lamp may be programmed to with an operating color mode in which the operating colors may be changed during operation of the LED lamp or LED lighting device, wherein the operating colors emit one or more colors of light in a predetermined pattern. In another example, the LED lighting device or LED lamp may be programmed with a dynamic operating mode in which the operating colors may change due to noise (e.g., music, beats, talking, etc.) during operation of the LED lamp or LED lighting device. Thus, embodiments of the present invention allow a user to take advantage of the wide range of colors and color functions at which LEDs may produce light.

In example embodiments, the LED lamp or LED lighting device allows a user to select one or more colors to emit through a single LED lamp or LED lighting device. One or more qualities of the light (e.g., color, color temperature, brightness, and/or the like) emitted by the LED lamp and/or LED lighting device may then be controlled based on a user engaging with the LED lamp, LED lighting device, and/or a controlling entity. One or more qualities of the light emitted by the LED lamp and/or LED lighting device may be modified through a switch and/or configured using a remote device (e.g., controller, phone, laptop, etc.), wherein the remote device is controlled by a user.

General Overview

Example embodiments of the present disclosure provide an LED lamp having at least two sets of light emitting diode(s) (LED(s)) packages and an optical assembly including at least two optical elements of an optical assembly. Two or more sets of LED packages each comprise at least one LED package, respectively. The LED lamp is configured to allow light of one or more colors to diffuse through at least one respective optical element in order to create a unique light effect. For example, in an example embodiment, the LED lamp includes at least two sets of LED packages and an optical assembly including at least two optical elements, wherein a first color emitted by a first set of LED packages is configured to diffuse and/or emit through a first optical element of the optical assembly and a second color emitted by a second set of LED packages is configured to diffuse and/or emit through a second optical element of the optical assembly. In example embodiments, the light diffusing through multiple optical elements simultaneously and/or individually may be configured to create a layer lighting effect that adds depth and dimension to the lighting produced by the LED lamp.

In various embodiments, one or more LED lamps including two or more sets of LED packages and an optical assembly including at least two optical elements are incorporated into an LED lighting device. In various embodiments, the LED lighting device may be a light fixture, a sconce, a luminaire, a set of string lights, a path light or set of path lights, a light set, and/or the like.

Example LED Lamp

Figure 1A:
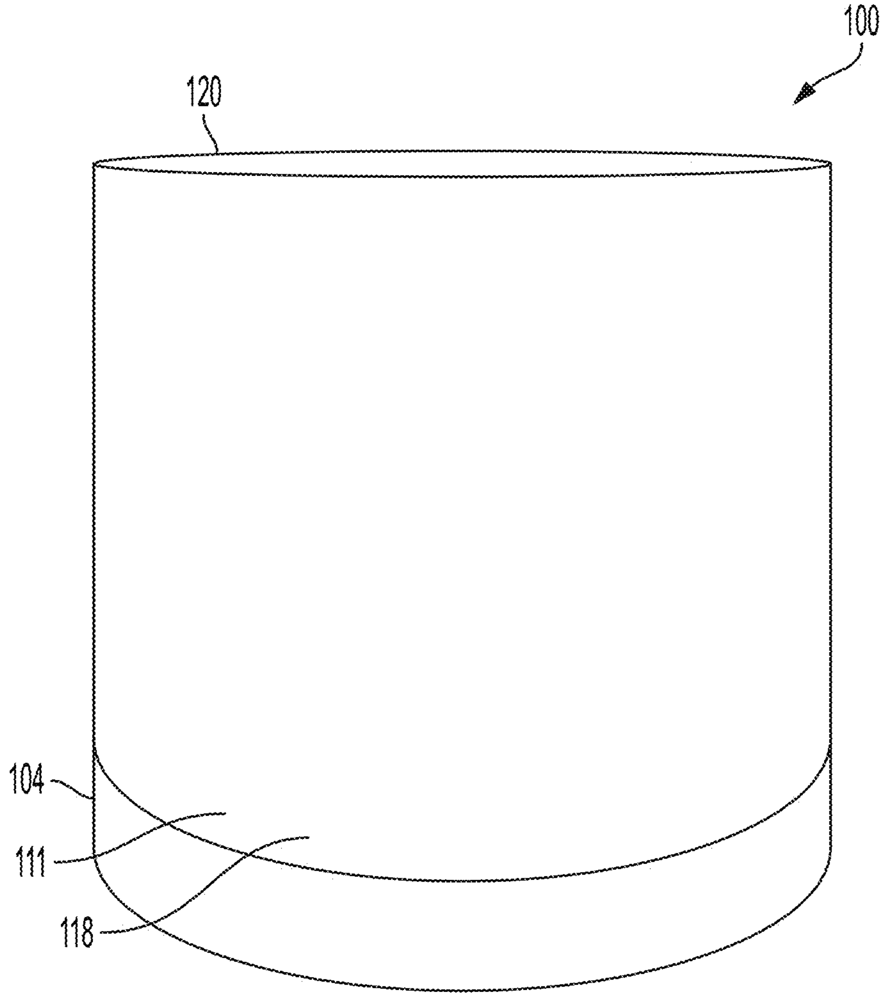
FIG. 1A illustrates an exemplary perspective view of an LED lamp in accordance with various embodiments of the present disclosure.
Figure 1B:
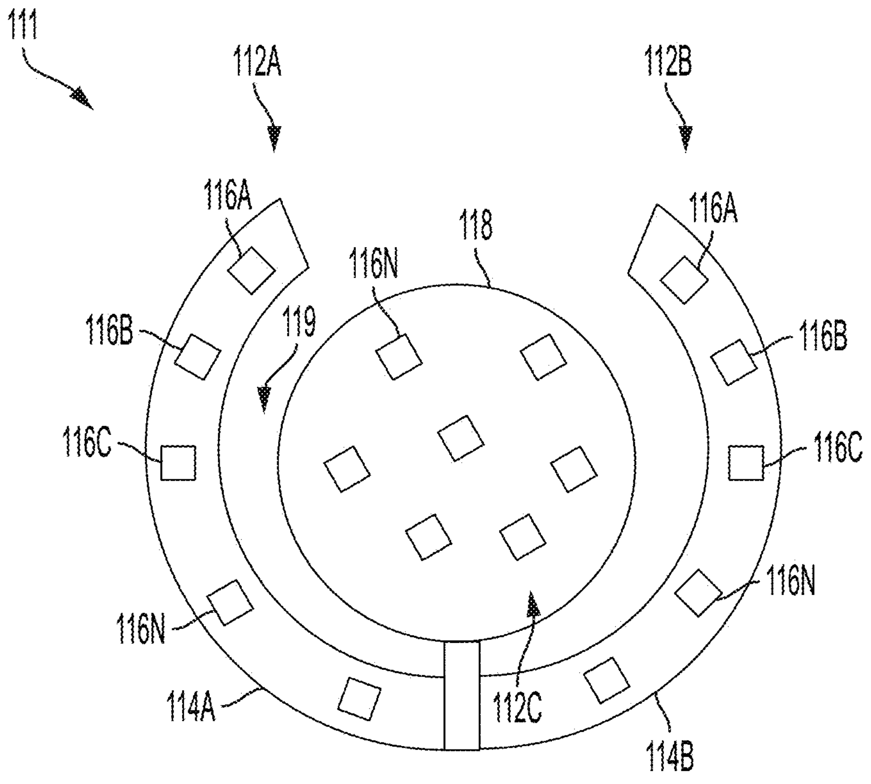
FIG. 1B illustrates an exemplary perspective view of an LED arrangement in accordance with various embodiments of the present disclosure.

FIG. 1A and FIG. 1B provide example perspective views of an example LED lamp 100 and an example LED arrangement 111 of an LED lamp in accordance with an example embodiment of the present invention. In example embodiments, the LED lamp 100 comprises an optical assembly 120 and a housing 104.

In various embodiments, an LED arrangement 111 (e.g., an arrangement of mounted LED packages) are mounted and/or secured within the housing 104. In various embodiments driver circuitry 109 is mounted and/or secured within the housing 104 (see FIG. 5). In various embodiments, the LED lamp housing is configured to house driver circuitry 109, a heat sink, heat dissipation element (e.g., fins, radiators, and/or the like), mobile power source (e.g., battery(ies)) and/or other elements of the LED lamp 100 and/or the LED lighting device 110.

In various embodiments, the optical assembly 120 is configured to be secured to the housing 104. In various embodiments, the optical assembly 120 is detachably securable to the housing 104 of the LED lamp 100. For example, the optical assembly 120 may comprise threading, magnets, snaps, latches, and/or the like to detachably connect and/or disconnect from the housing 104. In an example embodiment, the optical assembly 120 is non-removably secured to the housing 104 (e.g., using adhesive and/or the like).

In some embodiments, the outermost layer of the optical assembly 120 is configured to be the lamp envelope of the LED lamp 100. In example embodiments, the optical assembly 120 (e.g., lamp envelope) may be transparent, translucent, and/or semi-translucent and configured to at least partially enclose the LED arrangement 111 (e.g., at least two sets of LED packages) within the housing 104 of the LED lamp 100.

FIG. 1B depicts an exemplary top perspective view of a LED arrangement 111 in accordance with various embodiments of the present disclosure. In various embodiments, the LED arrangement 111 includes a plurality of LED packages. In various embodiments, the plurality of LED packages is mounted to, for example, a circuit board 118, printed circuit board, and/or the like. In various embodiments, the plurality of LED packages 111 is mounted and/or arranged so as to define a plurality (e.g., at least two) sets of LED packages 112 (e.g., 112A, 112B, 112C). In an example embodiment, the circuit board 118 includes one or more gaps 119 to facilitate heat dissipation.

Figure 1C:
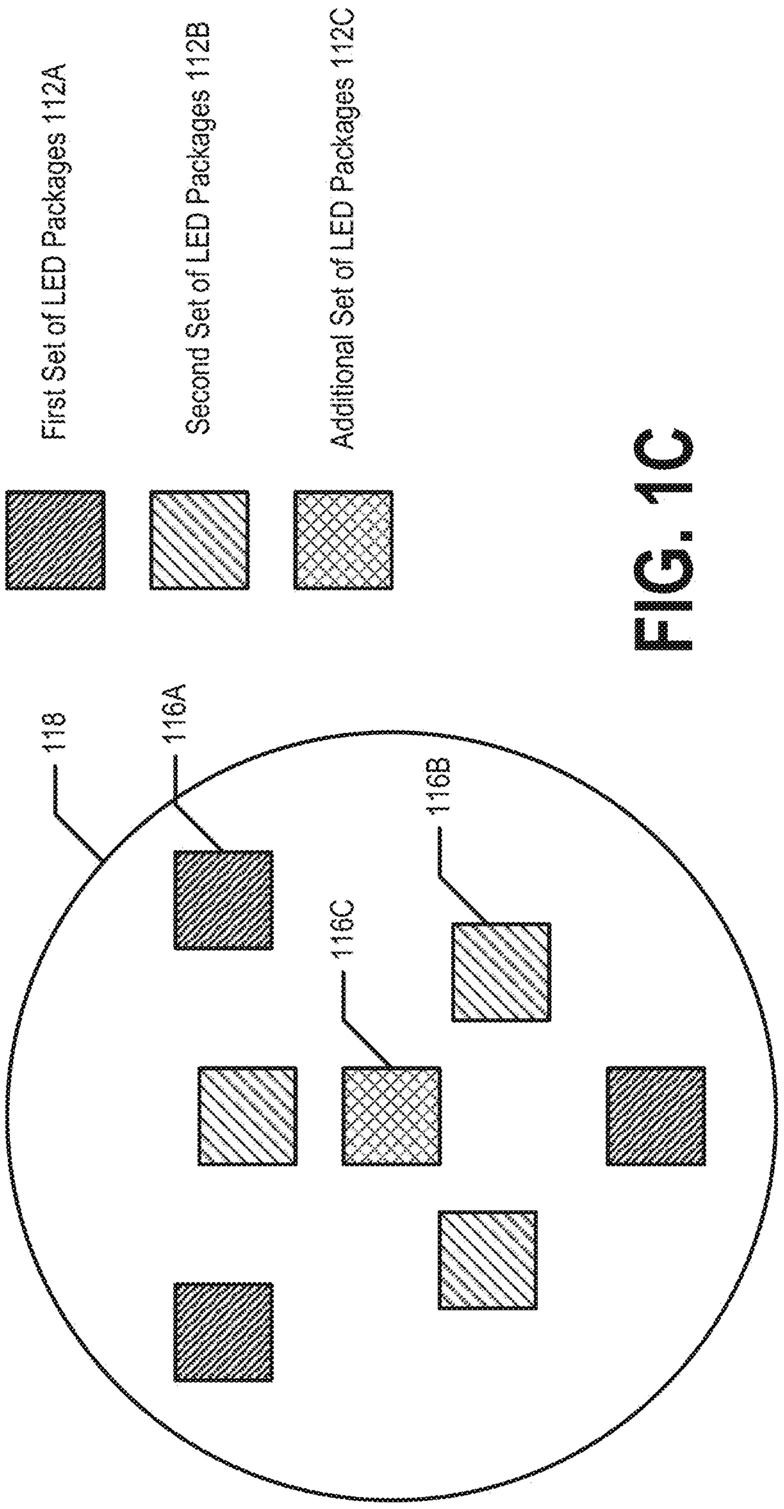
FIG. 1C illustrates another exemplary perspective view of an LED arrangement in accordance with various embodiments of the present disclosure.

FIG. 1C illustrates another example LED arrangement 111 comprising a plurality of LED packages 116 (e.g., 116A, 116B, 116C) mounted on a circuit board 118. The LED packages 116 are mounted on the circuit board 118 so as to define a plurality (e.g., three) sets of LED packages 112 (e.g., 112A, 112B, 112C). The sets of LED packages 112 are configured in a concentric manner. In the illustrated embodiment, the first and second sets of LED packages 112A, 112B each include a respective three LED packages 116 and the additional set of LED packages 112C includes a single LED package 116.

Figure 1D:
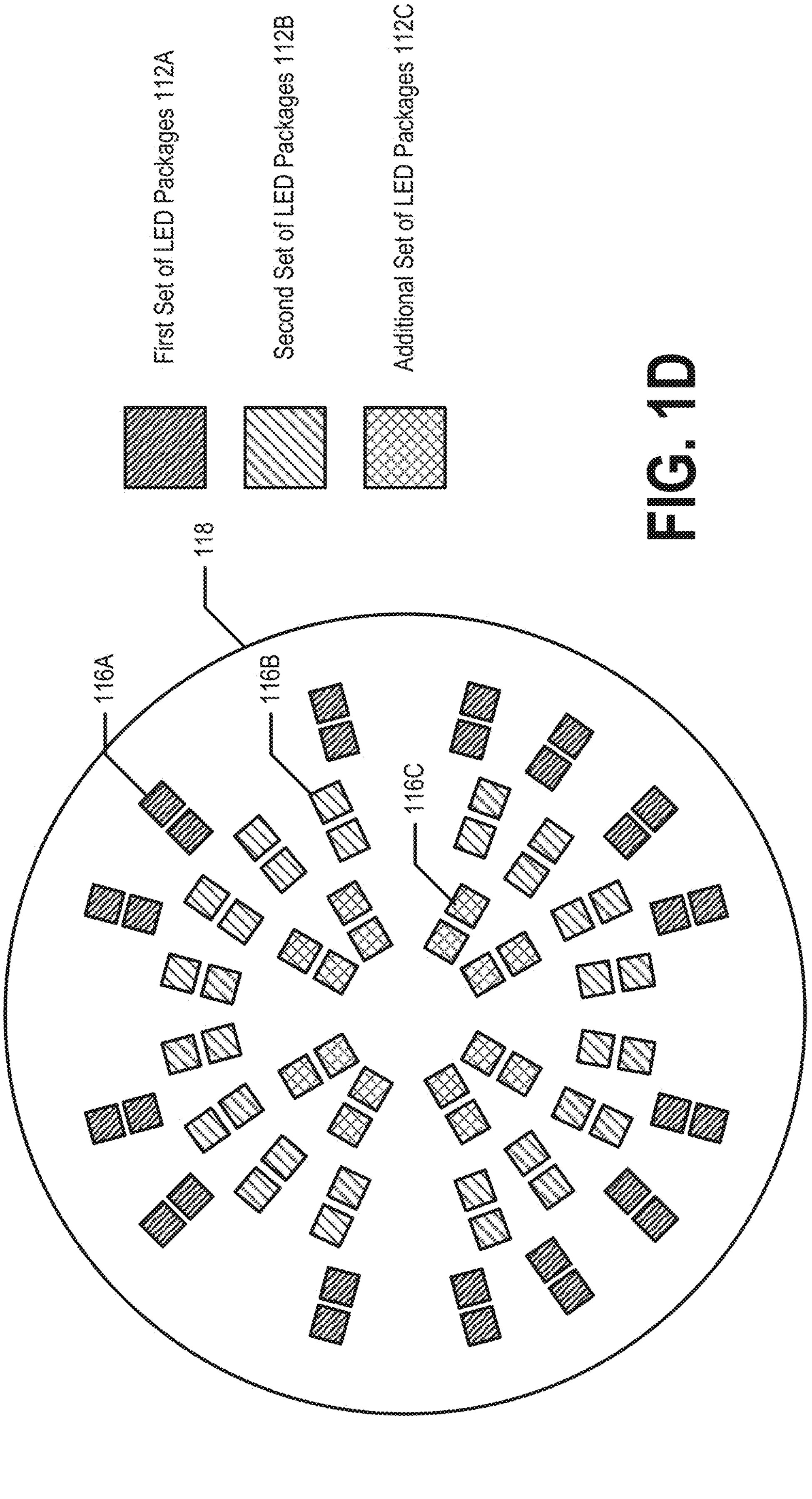
FIG. 1D illustrates another exemplary perspective view of an LED arrangement in accordance with various embodiments of the present disclosure.

FIG. 1D illustrates still another example LED arrangement 111 comprising a plurality of LED packages 116 mounted on a circuit board 118. The LED packages 116 are mounted on the circuit board 118 so as to define a plurality (e.g., three) sets of LED packages 112. The sets of LED packages 112 are configured in a concentric manner. In the illustrated embodiment, each set of LED packages 112 includes sixteen to thirty-two LED packages 116. Various embodiments may include fewer or more LED packages in each set of LED packages.

In example embodiments, the LED arrangement 111 includes at least two sets of LED packages 112A, 112B, 112C. In the illustrated LED arrangement 111, the first set of LED packages 112A is disposed on a first side of a circuit board 118 and a second set of LED packages 112B is disposed opposite to the first set of LED packages 112A on a second side of the circuit board 118. A third set of LED packages 112C are disposed on central portion of the circuit board 118. In the illustrated embodiment, the first side of the circuit board 118 and the second side of circuit board are each separated from the central portion of the circuit board 118 via respective gaps 119.

In various embodiments, each set of LED packages 112 includes at least one LED package 116 (e.g., 116A, 116B, 116C, 116N). In various embodiments, each LED package 116 of a set of LED packages 112 is configured to emit light of a same color and/or with a same light quality. For example, in an example embodiment, each of the LED packages 116 of the first set of LED packages 112A is configured to emit red light, each of the LED packages 116 of the second set of LED packages 112B is configured to emit blue light, and each of the LED packages of the third set of LED packages 112C is configured to emit green light. In an example embodiment, a fourth set of LED packages may consist of LED packages configured to emit white light.

Figure 5:
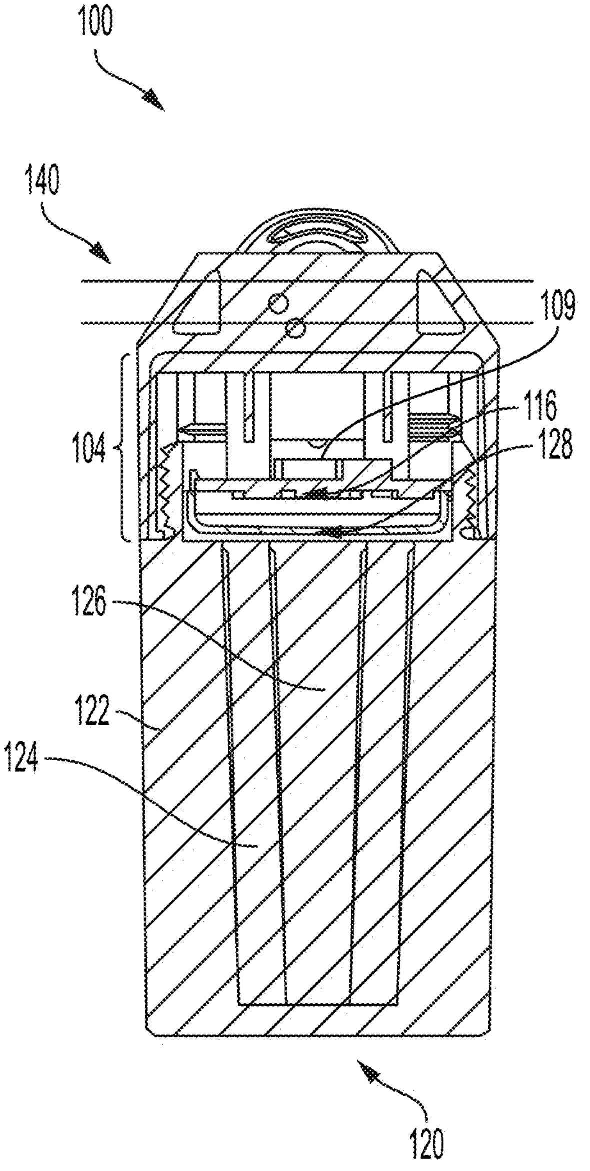
FIG. 5 illustrates an exemplary cross-sectional view of an LED lamp in accordance with various embodiments of the present disclosure.

In some embodiments, one or more additional sets of LED package(s) may be disposed directly underneath the disk optic 128 (see FIG. 5). In example embodiments, the two or more sets of LED packages are configured to positioned on one or more concentric ring 114A, 114B, wherein the one or more concentric rings 114A, 114B separated by gaps 119 to assist with heat dissipation within the LED arrangement 111 and/or LED lamp 100. In various embodiments, the first set of LED packages 112A and/or the second set of LED packages 112B may respectively comprise at least one LED package 116A, 116B, 116C, 116N (collectively "116"). In the depicted embodiments, the first set of LED package 112A and the second set of LED package 112B comprises at least five individual LED packages 116 configured to emit one or more color(s) of light. In example embodiments, the LED lighting device 110 may include at least one driver circuitry (not depicted) configured to control the two or more sets of LED packages. For example, in an example embodiment, the driver circuitry 109 may be mounted to the circuit board 118 (e.g., to the same side of the circuit board 118 as the LED packages 116 and/or to an opposite side of the circuit board 118 with respect to the LED packages 116).

In an example embodiment, the sets of LED packages 112 may be mounted in a concentric manner. For example, one or more LED packages 116 may be mounted at the center of the circuit board 118 to form a first set of LED packages 112A. Another one or more LED packages may be mounted around (e.g., in generally a ring formation) about the first set of LED packages 116 to form the second set of LED packages 112B. Yet another one or more LED packages may be mounted around (e.g., in generally a ring formation) about the second set of LED packages 116 to form a third set of LED packages 112C. For example, in an example embodiment the LED packages 116 of the sets of LED packages 112 may be mounted in concentric rings on the circuit board 118. In an example embodiment, each ring of LED packages 116 (e.g., each set of LED packages 112) includes LED packages of a same color (e.g., red, blue, green, or white). In an example embodiment, one or more rings of LED packages (e.g., a set of LED packages 112) includes LED packages of more than one color.

In an example embodiment, each ring of LED packages 116 (e.g., each set of LED packages 112) is aligned with a respective optical element. For example, the sets of LED packages 112 may be arranged in nested rings and the optical elements are arranged as nested structures that are aligned with the respective nested rings of LED packages 116 (e.g., sets of LED packages 112).

The LED packages of the at least two sets of LED packages may be mounted in various arrangements in various embodiments, as appropriate for the application.

In example embodiments, the one or more LED packages 116 of the sets of LED package 112 may be a small (e.g., 3.8 mm×3.8 mm) RGBW (e.g., red, green, blue, and white) LED packages. In an example embodiment, the at least two sets of LED packages include separated RGB (red, green, blue) LED packages and white LED packages. In example embodiments, an LED package comprises one or more LED chips, electrical contacts, and optionally phosphor (e.g., to cause the LED package to emit white light). The LED package 116 may further comprise encapsulant to protect the one or more LED chips, wire bonds, and/or the phosphor. In an example embodiment, the LED packages 116 may comprise one or more alternate current (AC) driven LEDs. In an example embodiment, each of the LED packages 116 is a respective single color LED package (e.g., each of the LED chips of the LED package are the same color). In an example embodiment, one or more of the LED packages 116 are multiple color LED packages (e.g., the LED package includes different color LED chips).

Figure 2:
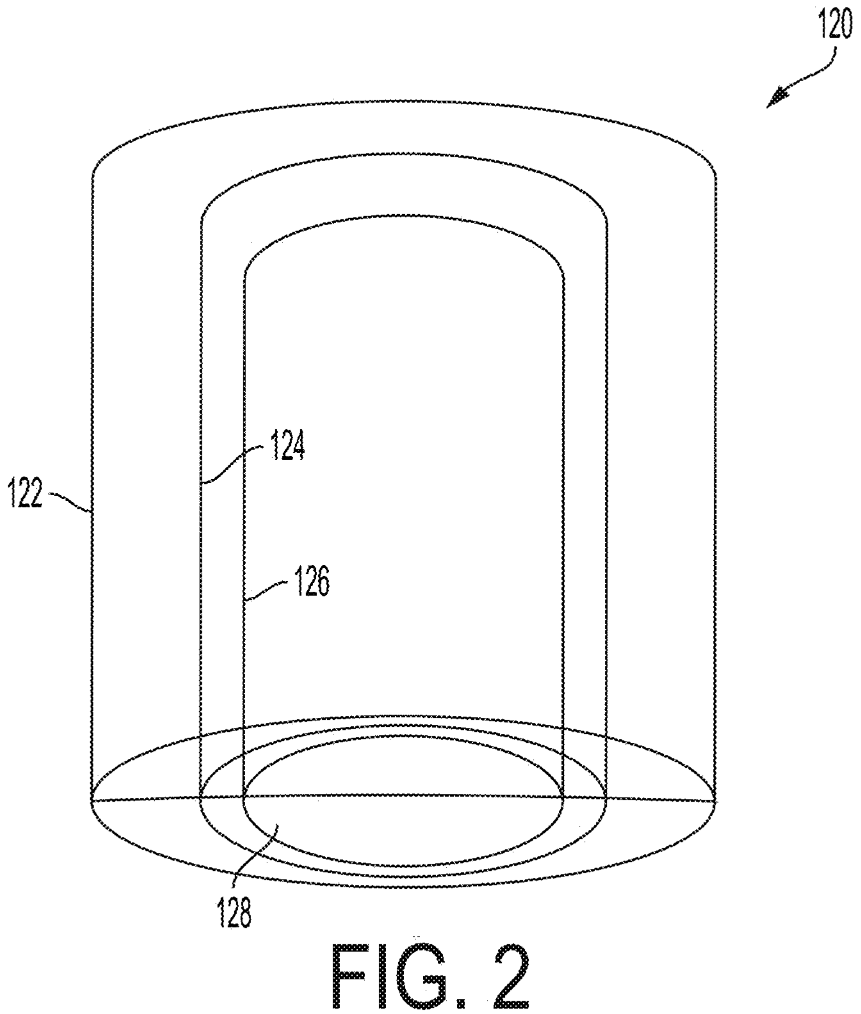
FIG. 2 illustrates an exemplary cross-sectional view of an optical assembly in accordance with various embodiments of the present disclosure.

In some embodiments, the LED lamp 110 includes an optical assembly including two or more optical elements, as shown in FIG. 2. The first set of LED packages 112A may be configured to emit light at a first color and the second set of LED package 112B may be configured to emit light at a second color, simultaneously. In example embodiments, the LED lamp 100 may further comprise a third and/or fourth set of LED packages configured to emit light at a third and/or fourth color, respectively. The first, second, third, and fourth colors are different from one another. For example, in an example embodiment, the first color is red and the second color is green. In another example, the first color is red and the second color is white. In another example embodiment, the first color is a cool white and the second color is a warm white.

In example embodiments, each of the sets of LED packages 112 is in electrical communication with driver circuitry 109 such that the LED packages 116 of the set of LED packages 112 may be operated by the driver circuitry 109. For example, the driver circuitry 109 may provide a controlled electrical current to the LED packages 116 of at least one set of the LED packages 112. For example, the driver circuitry 109 may be configured to only operate the LED packages 116 of the first set of LED packages 112A to cause the LED lamp 100 or LED lighting device 110 to emit light of a first color. In another example, the driver circuitry 109 may be configured to only operate the LED packages 116 of the second set of LED packages 112B to cause the LED lamp 100 or LED lighting device 110 to emit light of a second color. In another example, the driver circuitry 109 may be configured to operate the respective LED packages of one or more additional sets of LED packages to cause the LED lamp 100 or LED lighting device 110 to emit light of one or more additional colors. In another example, the driver circuitry 109 may be configured to operate the LED packages 116 of both the first set of LED packages 112A and the second set of LED packages 112B to cause the LED lamp 100 to emit light with a combination of the first color and the second color. In example embodiments, the first color, second color, and one or more additional colors may be configured to be different from one another. For example, the first set of LED packages may emit a first color (e.g., red), the second set of LED packages may emit a second color (e.g., green), and the one or more additional set of LED packages may emit one or more additional color (e.g., blue, white, etc.). In another example embodiment, the first color, second color, and/or one or more additional colors may be configured to be the same.

In example embodiments, the one or more LED packages 116 may be configured to provide light that varies in colors, brightness, color temperature, pattern, and/or the like based on the current provided to the LED packages 116 of the two or more sets of LED packages 112 by the driver circuitry 109. For example, the driver circuitry 109 may provide a first current to the LED packages 116 of a first set of LED packages 112A to cause the one or more LED package(s) 116 to provide light having particular light aspects or qualities and provide a second current to the LED packages of a second set of LED packages 112B to cause the one or more LED package(s) 116 to provide light having different light aspects or qualities.

FIGS. 18-24 provide a perspective view, left side view, right side view, front side view, back side view, top view, and bottom view, respectively of an example embodiment of an LED lamp 100.

FIGS. 25-31 provide a perspective view, left side view, right side view, front side view, back side view, top view, and bottom view, respectively of another example embodiment of an LED lamp 100.

FIGS. 32-38 provide a perspective view, left side view, right side view, front side view, back side view, top view, and bottom view, respectively of yet another example embodiment of an LED lamp 100.

Example Driver Circuitry

In example embodiments, the driver circuitry 109 may be configured to provide a controlled electrical current to the LED packages 116 of at least one set of LED packages 112 during operation of the LED lamp 100 or LED lighting device 110. In an example embodiment, each LED lamp 100 of an LED lighting device 110 includes respective driver circuitry 109. In an example embodiment, the LED lighting device 110 includes driver circuitry 109 configured to control the electrical current provided to the LED packages of a plurality of LED lamps 100 of the LED lighting device 110.

In various embodiments, the driver circuitry 109 may comprise a circuit portion configured to convert AC voltage into DC voltage. In some embodiments, the driver circuitry 109 may comprise a circuit portion configured to control the current flowing through the LED packages of two or more sets of LED packages 112. In certain embodiments, the driver circuitry 109 may comprise a circuit portion configured to dim the LED lamp 100 or LED lighting device 110. In various embodiments, additional circuit components may be present in the driver circuitry 109. Similarly, in various embodiments, all or some of the circuit portions mentioned here may not be present in the driver circuitry 109. In some embodiments, circuit portions listed herein as separate circuit portions may be combined into one circuit portion. As should be appreciated, a variety of driver circuitry configurations are generally known and understood in the art and any of such may be employed in various embodiments as suitable for the intended application, without departing from the scope of the present invention.

In another example, the driver circuitry 109 may be configured to provide a particular current to two or more sets of LED packages 112 to provide light having specific light aspects qualities (e.g., color, brightness, color temperature, pattern, and/or the like). For example, the driver circuitry 109 may be configured to drive one or more LED packages 116 such that the LED packages 116 provide light having the desired light aspects or qualities. In various embodiments, the driver circuitry 109 includes one or more electrical components configured to control dimming of light emitted by the LED lamp and/or LED lighting device.

In various embodiments, the LED lamp and/or LED lighting device includes multiple instances of driver circuitry 109. For example, the LED lamp and/or LED lighting device includes an instance of driver circuitry 109 for each set of LED packages 112 of the plurality of sets of LED packages, in an example embodiment. In an example embodiment, the LED lamp and/or LED lighting device includes an instance of driver circuitry 109 for each color of LED package included in the LED lamp and/or LED lighting device. For example, in an example embodiment, a first instance of driver circuitry 109 is configured to control operation and/or provide a controlled electrical current to each of the red LED packages of the LED lamp and/or LED lighting device, a second instance of driver circuitry 109 is configured to control operation and/or provide a controlled electrical current to each of the blue LED packages of the LED lamp and/or LED lighting device, a third instance of driver circuitry 109 is configured to control operation and/or provide a controlled electrical current to each of the green LED packages of the LED lamp and/or LED lighting device, and a fourth instance of driver circuitry 109 is configured to control operation and/or provide a controlled electrical current to each of the white LED packages of the LED lamp and/or LED lighting device.

In an example embodiment, the driver circuitry 109 is mounted to the same circuit board as the LED packages. In an example embodiment, the driver circuitry 109 is mounted to a different circuit board than the circuit board to which the LED packages are mounted.

Example Optical Assembly

Figure 3:
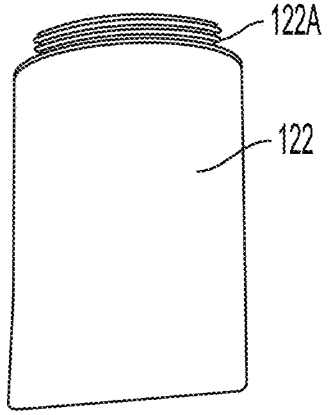
FIG. 3 illustrates an exemplary perspective view of an optical element in accordance with various embodiments of the present disclosure.
Figure 4:
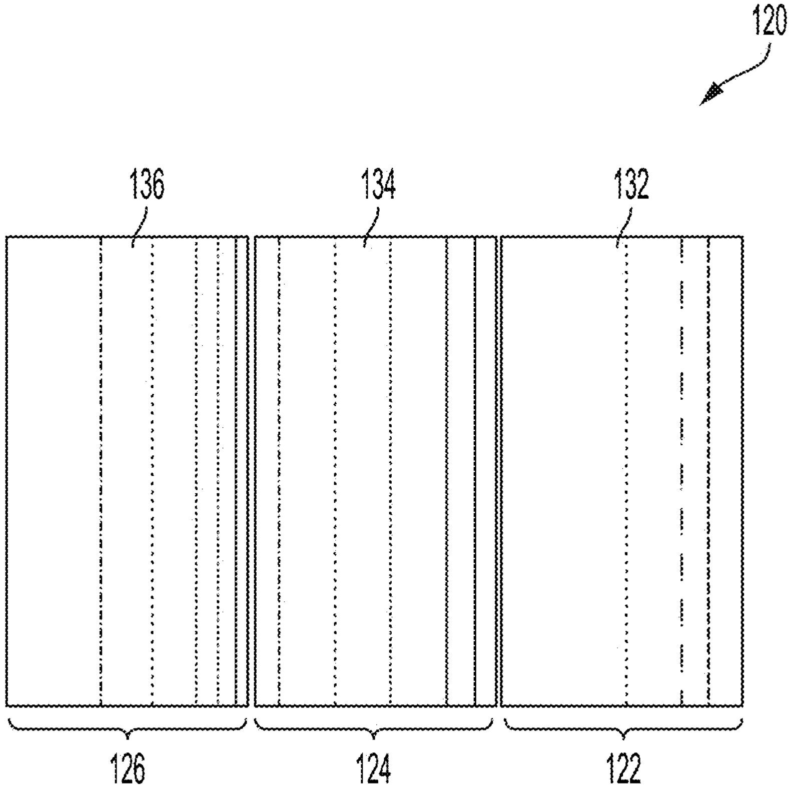
FIG. 4 illustrates an exemplary cross-sectional view of an optical assembly in accordance with various embodiments of the present disclosure.

FIG. 2 to FIG. 4 illustrate prospective views of an optical assembly 120 and portions thereof in accordance with embodiments of the present invention. In various embodiments, an optical assembly 120 is configured to comprise a plurality of optical elements (e.g., two or more optical elements). In various embodiments, the optical assembly includes a disk optic 128. In various embodiments, each optical element of the optical assembly is configured to control dispersion of light of a corresponding set of LED packages of the LED lamp 100. In an example embodiment, a first optical element is configured as an envelope of the LED lamp 100 and is configured to control dispersion of light of a corresponding set of LED packages of the LED lamp 100. In an example embodiment, the first optical element is configured as an envelope of the LED lamp 100 and the remainder of the plurality of optical elements are each configured to control, at least in part, dispersion of light of a corresponding set of LED packages of the LED lamp 100.

FIG. 2 illustrates an exemplary cross-sectional view of an optical assembly in accordance with various embodiments of the present invention. With reference to FIG. 2, in various embodiments, the optical assembly 120 may comprise at least two individual optical elements (e.g., a first optical element 122, a second optical element 124, and/or one or more additional optical element 126). In example embodiments, the optical elements are configured to be cylindrical (with various cross-sectional shapes) or frustoconical (with various cross-sectional shapes) optical elements. In various embodiments, the optical elements (e.g., 122, 124, 126) are transparent, semi-transparent, textured, colored, include diffusing particles, include an outer surface surface treatment, include an interior surface surface treatment, and/or the like. In various embodiments, the optical elements (e.g., 122, 124, 126) are configured to disperse light having a respective color or light quality in a particular manner or pattern.

In some embodiments, the optical assembly 120 comprises three or more optical elements. In various embodiments, the optical elements are configured and/or arranged in a concentric pattern. For example, in the depicted embodiment, the optical assembly comprises a first optical element 122, a second optical element 124, and/or one or more additional optical elements 126, wherein the second optical element 124 is configured to fit within the first optical element 122 and the one or more additional optical element(s) is configured to fit within the second optical element 124.

For example, in an example embodiment, the first optical element 122 is cylindrical and the axis thereof is aligned with the optical axis of the LED lamp 110. This example first optical element 122 has a circular cross-section in a plane perpendicular to the optical axis of the LED lamp 110. In this example embodiment, the second optical element 124 is frustoconical and the axis thereof is aligned with the optical axis of the LED lamp 110. This example second optical element 122 has a circular cross-section in a plane perpendicular to the optical axis of the LED lamp 110. In this example embodiment, the additional optical element 126 is cylindrical and the axis thereof is aligned with the optical axis of the LED lamp 110. This example additional optical element 126 has a circular cross-section in a plane perpendicular to the optical axis of the LED lamp 110.

In various embodiments, various ones of the first optical element 122, second optical element 124, and additional optical element(s) 126 are cylindrical, frustoconical, prismatic, and/or pyramidal. In various embodiments, the respective shapes of the first optical element 122, second optical element 124, and additional optical element(s) 126 define respective axes, which are substantially aligned with the optical axis of the LED lamp 110. In various embodiments, the respective shapes of the first optical element 122, second optical element 124, and additional optical element(s) 126 define respective axes, which are substantially aligned with one another and, at least in part, define the optical axis of the LED lamp 110. In various embodiments, the cross-sectional shapes of the first optical element 122, second optical element 124, and additional optical element(s) 126 in a plane perpendicular to the optical axis of the LED lamp 110 are circles, ellipses, square, triangles, polygons, rhombuses, and/or the like. In an example embodiment, each of the first optical element 122, second optical element 124, and additional optical element(s) 126 are of the same shape and have the same cross-sectional shape. In various embodiments, one (or more) of the first optical element 122, second optical element 124, and additional optical element(s) 126 may have a different shape (compared to at least one other optical element of the optical assembly 120) and/or a different cross-sectional shape (compared to at least one other optical element of the optical assembly 120).

In example embodiments, the optical elements 122, 124, 126 may be transparent, semi-transparent, textured, colored, include diffusing particles, include an outer surface surface treatment, include an interior surface surface treatment, and/or the like. and configured to enclose the two or more sets of LED packages 112 within the housing 104 of the LED lamp 100. In example embodiments, the first optical element is configured to be the outermost optical element of the optical assembly 120 and/or the envelope of the LED lamp 100. In some embodiments, the first optical element 122 may comprise a connection mechanism (e.g., threading, magnets, clamps, snaps, and/or the like), such that the first optical element 122 may be detachably attached and detached to the housing of the LED lamp 100.

In an example embodiment, the two or more optical elements of the optical assembly 120 are connected to one another such that detaching the first optical element 122 from the housing 104 causes the optical assembly 120 to be detached from the housing 104. In an example embodiment, one or more of the optical elements is secured to the housing 104 such that when the first optical element 122 is detached from the housing 104, the one or more optical elements remain secured to the housing 104.

In various embodiments, the optical assembly 120 may be scalable, wherein one or more additional concentric optical elements may be added to the optical assembly. In some embodiments, the optical system, LED lighting device, and/or LED lamp may provide light from multiple directions (e.g., top and bottom, bottom and side, top and side, and/or the like).

Figure 11A:
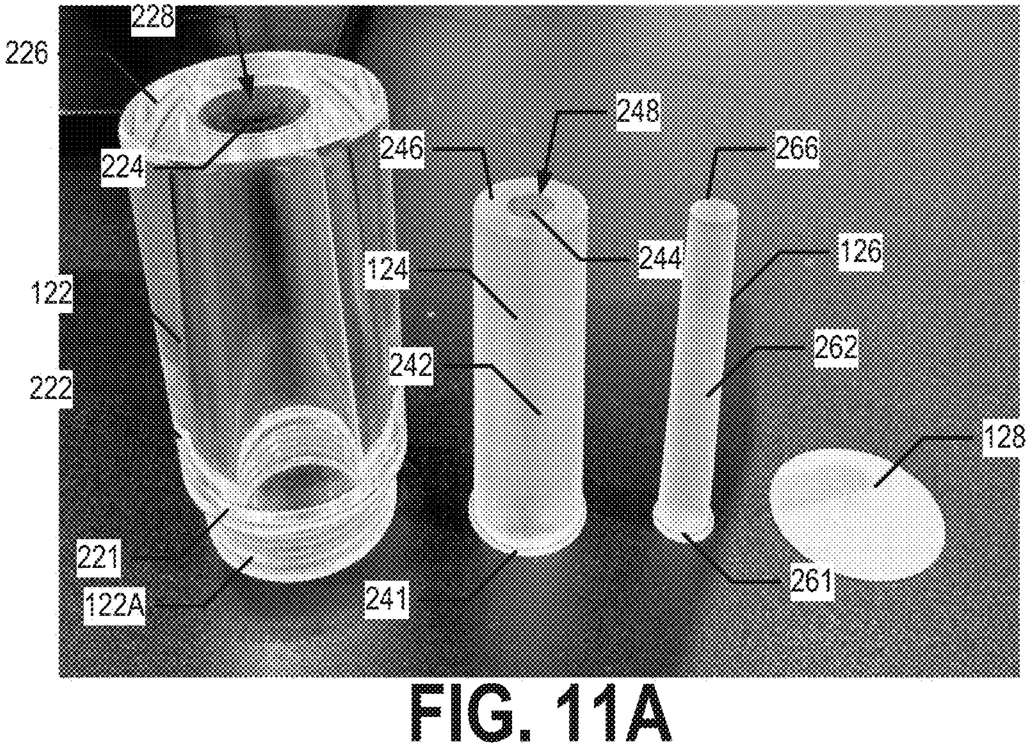
FIG. 11A illustrates a dissembled optical assembly, in accordance with various embodiments of the present disclosure.
Figure 11B:
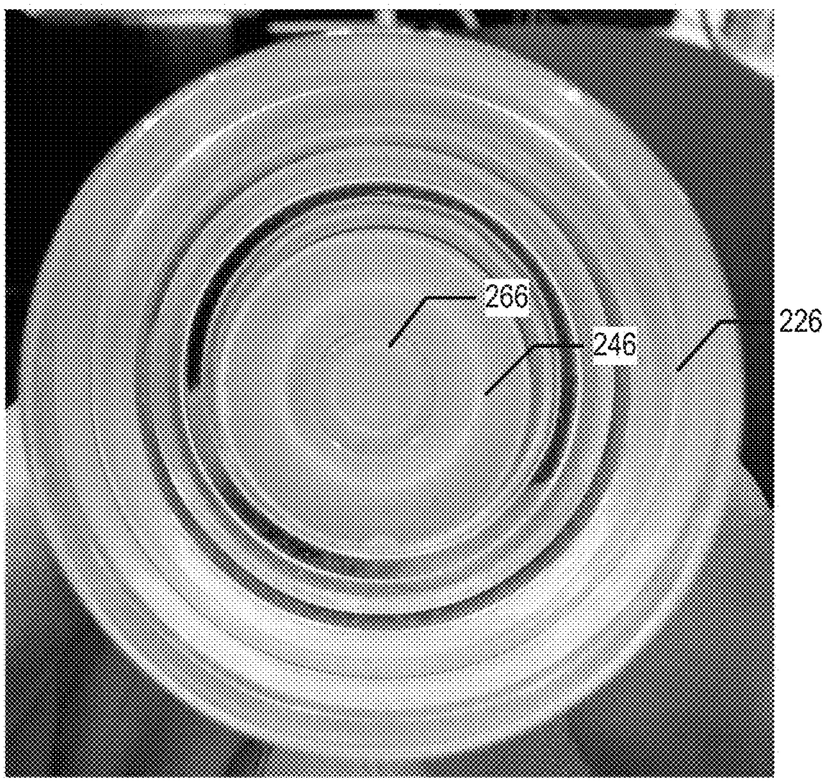
FIG. 11B illustrates a face on view of the optical assembly shown in FIG. 11A in an assembled configuration, in accordance with various embodiments of the present disclosure.

FIGS. 11A and 11B illustrate an example optical assembly in a disassembled configuration and in an assembled configuration. For example, the optical assembly 120 comprises a plurality of optical elements (e.g., the first optical element 122, second optical element 124, and additional optical element 126) configured as nesting cylindrical and/or frustoconical structures. The first optical element 122 includes a connection mechanism 122A for securing the optical assembly 120 and/or the first optical element 122 to a housing 104. The first optical element 122 further comprises an outer surface 222 that extends up from the connection mechanism 122A to an end surface 226. An inner surface 224 of the first optical element 122 extends from the end surface 226 back toward the connection mechanism 122A. The inner surface 224 defines a gap or opening 228. In various embodiments, the space between the outer surface 222 and the inner surface 224 (shown as 152 in FIGS. 13A and 13B) may be empty (e.g., a vacuum), filled with air or another gas, filled with a material used to form the outer and inner surfaces 222, 224, and/or filled with another material other than the material used to form the outer and inner surfaces 222, 224.

In an example embodiment, where the inner surface 224 meets the connection mechanism 122A, a seat 221 is formed. The seat 221 is configured for receiving and/or engaging a flange 241 of the second optical element 124. For example, the second optical element 124 includes an outer surface 242 that extends from the flange 241 to an end surface 246. An inner surface 244 extends from the end surface 246 back toward the flange 241 and/or an opposite end of the second optical element 124 that includes the flange 241 (and is opposite the end surface 246). The inner surface 244 defines a gap or opening 248.

In various embodiments, the outer surface 242 of the second optical element 124 defines a diameter that is approximately equal to (though slightly less than) the diameter of the gap or opening 228 of the first optical element 122. In an example embodiment, the second optical element 124 is configured to be positioned within the gap or opening 228. In an example embodiment, the second optical element 124 is configured to be positioned within the gap or opening 228 and retained therein at least in part by the engagement of the flange 241 with the seat 221 and/or a friction fit.

In various embodiments, the space between the outer surface 242 and the inner surface 244 (shown as 154 in FIGS. 13A and 13B) may be empty (e.g., a vacuum), filled with air or another gas, filled with a material used to form the outer and inner surfaces 242, 244, and/or filled with another material other than the material used to form the outer and inner surfaces 242, 244.

In an example embodiment, the inner surface 244 includes a seat proximate the flange 241. In an example embodiment, the seat of the second optical element 124 is configured for receiving and/or engaging a flange 261 of the additional optical element 126. For example, the additional optical element 126 includes an outer surface 262 that extends from the flange 261 to an end surface 266. In the illustrated embodiment, the end surface 266 of the additional optical element 126 does not include a gap or opening.

In various embodiments, the outer surface 262 of the additional optical element 126 defines a diameter that is approximately equal to (though slightly less than) the diameter of the gap or opening 248 of the second optical element 124. In an example embodiment, the additional optical element 126 is configured to be positioned within the gap or opening 248. In an example embodiment, the additional optical element 126 is configured to be positioned within the gap or opening 248 and retained therein at least in part by the engagement of the flange 261 with the seat formed in the inner surface 244 of the second optical element 124 and/or a friction fit.

In various embodiments, the space within the volume defined by the outer surface 262 and the end surface 266 (shown as 156 in FIGS. 13A and 13B) may be empty (e.g., a vacuum), filled with air or another gas, filled with a material used to form the outer surface 262, and/or filled with another material other than the material used to form the outer surface 262.

As shown in FIG. 11B, the end surfaces 226, 246, 266, and the gaps 228, 248 are configured such that when the optical assembly 120 is assembled, a cohesive and/or continuous end surface of the optical assembly is formed.

In various embodiments, the end surface 226, 246, 266 of the optical elements have a different surface texture compared to the body, outer surface, or interior surface of the respective optical element. For example, the end surface of an optical element may have a surface texture configured to provide a further unique appearance, control some level of light directionality, shine light from the end surfaces onto other surfaces, and/or the like.

FIG. 12A provides a perspective view of the first optical element 122, second optical element 124, and additional optical element 126 of an example embodiment of an optical assembly 120. FIG. 12B provides a top view of the first optical element 122, second optical element 124, and additional optical element 126 shown in FIG. 12A. FIG. 12C provides a cross-sectional view of the first optical element 122, second optical element 124, and additional optical element 126 shown in FIG. 12A taken along line B-B shown FIG. 12B.

In the example embodiment shown in FIGS. 12A, 12B, and 12C, the gap or opening 228 does not extend through the end surface 226 of the first optical element 122. For example, the gap or opening 228 is defined, at least in part, by interior surface 224 and cap surface 229. When the second optical element 124 is positioned within the gap or opening 228 of the first optical element 122, the end surface 246 abuts the cap surface 229, in an example embodiment. When the additional optical element 126 is positioned within the gap or opening 248 of the second optical element 124, the end surface 266 abuts the cap surface 229.

As shown in FIG. 12C, the first optical element 122 includes a first light input surface 223, the second optical element 124 includes a second light input surface 243, and the additional optical element 126 includes an additional light input surface 263. When the optical assembly 120 is attached to a housing 104 including an LED arrangement 111, the first set of LED packages is substantially aligned (e.g., in a direction parallel to the optical axis of the LED lamp 100) with the first light input surface 223. When the optical assembly 120 is attached to a housing 104 including an LED arrangement 111, the second set of LED packages is substantially aligned (e.g., in a direction parallel to the optical axis of the LED lamp 100) with the second light input surface 243 and an additional set of LED packages is substantially aligned (e.g., in a direction parallel to the optical axis of the LED lamp 100) with the additional light input surface 263.

For example, light emitted by the LED package(s) of the first set of LED packages is emitted toward the first light input surface 223, enters the space 152 where the light interacts with the material present therein, and is dispersed through the outer surface 222 and/or the end surface 226 of the first optical element 122. For example, light emitted by the LED package(s) of the second set of LED packages is emitted toward the second light input surface 243, enters the space 154 where the light interacts with the material present therein, and is dispersed through the outer surface 242 and/or the end surface 246 of the second optical element 124. For example, light emitted by the LED package(s) of the additional set of LED packages is emitted toward the additional light input surface 263, enters the space 156 where the light interacts with the material present therein, and is dispersed through the outer surface 262 and/or the end surface 266 of the additional optical element 126.

In various embodiments, an optical couplant is disposed between the LED packages 116 of a set of LEDs 112 and the light input surface 223, 243, 263 of a corresponding optical element. For example, the optical couplant may be an optical coupling gel, such as silicone, configured to aid the coupling of light emitted by LED packages 116 of a set of LED packages 112 into the corresponding optical element via the light input surface 223, 243, 263. In various embodiments, one or more of the light input surfaces 223, 243, 263 are roughened (e.g., not smooth) to reduce the amount of light reflecting off of the light input surfaces.

In an example embodiment, the outer surfaces 242, 262 of the second optical element 124 and the additional optical element(s) 126 may be textured (e.g., via respective diffusing particles and/or structure and/or surface treatment 134, 136) such that the light dispersed through the second and additional optical elements 124, 126 is primarily dispersed through the respective end surfaces 246, 266. For example, 50% or more of the light that enters the second optical element 124 via the second light input surface 243 is dispersed through the end surface 246 and 50% or more of the light that enters the additional optical element 126 via the additional light input surface 263 is dispersed through the end surface 266, in an example embodiment.

With further reference to FIG. 2, in various embodiments, the first optical element 122 is configured to be at least partially hallow, wherein the second optical element 122 is configured to be housed within the first optical element 122. In further embodiments, the second optical element 124 is also configured to be at least partially hallow, wherein the one or more additional optical elements 126 are configured to be housed within the first optical element 122 and the second optical element 124.

In various embodiments, the optical assembly 120 may include a disk optic 128. In various embodiments, the disk optic 128 is disposed, at least in part between the LED packages of a set of LEDs and the corresponding optical element. For example, in an example embodiment, the disk optic 128 encloses the LED packages 116 of the two or more sets of LEDs such that when the first optical element 122 (and possibly the second optical element 124 and/or additional optical element(s) 126) are detached from the housing 104, user access to the LED packages is prevented by the disk optic 128.

In example embodiments, a surface of the second optical element 124 closest to the housing 104 and/or the surface of the one or more additional optical element 126 closest to the housing 104 may be configured to contact at least partially the disk optic 128. In an example embodiment, the disk optic 128 may be a disk optic disk and/or any other shape disk optic element necessary to achieve the desired function. In some embodiments, the disk optic 128 may be configured to diffuse and/or blend light emitted by one or more sets of LED packages of the LED lighting device 110, wherein the disk optic may ensure the light is distributed evenly through one or more optical element. For example, the LED packages 116 of a set of LED packages 112 may be mounted at discrete position in a ring arrangement and the disk optic 128 may be configured to provide light to the corresponding optical element in an approximately continuous manner around the surface of the corresponding optical element closest to the housing 104. In an example embodiment, the disk optic 128 is a transparent film, encapsulant, and/or the like configured to enclose an opening to the housing such that the LED packages mounted within the housing are protected by the disk optic 128 from moisture, dirt, etc.

FIG. 3 depicts a perspective view of an optical assembly in accordance with various embodiments of the present disclosure. With reference to FIG. 3, in various embodiments, a first optical element 122 (e.g., the envelope) may comprise a connection mechanism 122A, wherein the connection mechanism may be threads, magnets, snaps, clamps, and/or the like configured to at least partially detachably connect and/or disconnect the optical assembly to the housing 104 of an LED lamp. In various embodiments, the connection mechanism 122A is a snap fit or a surface configured to be secured to the housing 104 via an adhesive. In various embodiments, the first optical element 122 is in a connected position, wherein the optical assembly is attached to the housing 104 of the LED lamp 100, each optical element is aligned with a respective set of LED packages. In various embodiments, the LED lamp may be configured to operate while the optical assembly is attached and/or detached to the housing.

With reference to FIGS. 4, 13A, 13B, and 13C, in various embodiments, the optical assembly 120 is configured to allow light emitted by one or more sets of LED packages to diffuse and/or emit through one or more optical elements in accordance with embodiments of the present disclosure. In example embodiments, the optical elements of the optical assembly 120 comprise diffusing particles and/or structure, respectively. In various embodiments, a respective optical element of the optical assembly is configured to control dispersion of light emitted by a respective set of LED packages. The diffusing particles integrated into and/or structure of the respective optical element is configured to cause the dispersion of the light emitted by the respective set of LED packages in a particular manner and/or pattern.

In some embodiments, the first optical element 122 may comprise first diffusing particles and/or structure 132, the second optical element 124 may comprise second diffusing particles and/or structure 134, and/or the one or more additional optical element 126 may comprise one or more additional diffusing particles and/or structure 136. In an example embodiment, the diffusing particles and/or structures are disposed within and/or are applied to the surface of the material of the optical elements. For example, the material of the first optical element 122 may include first diffusing particles and/or structure 132, the material of the second optical element 124 may include second diffusing particles and/or structure 134, and/or the one or more additional optical element 126 may include one or more additional diffusing particles and/or structure 136.

In various embodiments, the first diffusing particles and/or structure 132 is configured to be different than the second diffusing particles and/or structure 134 and/or than the one or more additional diffusing particles and/or structure 136. In various embodiments, the first diffusing particles and/or structure 132 may be configured to allow a first color emitted by one or more sets of LED packages to diffuse through the first optical element 122, the second diffusing particles and/or structure 134 is configured to allow a second color emitted by one or more sets of LED packages to diffuse through the second optical element 124, and the one or more additional diffusing particles and/or structure 136 is configured to allow one or more additional color emitted by one or more sets of LED packages to diffuse through the one or more additional optical element 126. In various embodiments, the first color, the second color, and the one or more additional color are configured to be different from each other. In example embodiments, the diffusing of one or more colors through the one or more optical elements may cause a layered lighting effect.

With further reference to FIG. 4, in various embodiments, the diffusing particles and/or structures of the optical elements may be configured to be a surface treatment of the one or more optical elements. For example, the diffusing particles and/or structure may be applied to and/or formed in an inner surface and/or an outer surface of a respective optical element.

Some non-limiting examples of diffusing particles, structures, and/or surface treatments applied to an inner and/or outer surface of a respective optical element or disposed within the respective optical element in various embodiments include frosting (e.g., by roughening a plastic), etching, striations, painting or screen printing, molding, and a design (e.g., a flame, a star, a series of stars, a heart, a series of hearts, a butterfly, a series of butterflies, seasonal symbols such as jack-o-lanterns, witch's hats, bells, Christmas trees, menorahs, Easter eggs, bunnies, flags, watermelon, etc.). For example, a design may be etched into the surface of an optical element, or applied to the surface (e.g., painted), or formed within the material of the optical element (e.g., using laser engraving and/or the like). Such treatments might be incorporated for light distribution, light effects, and/or decorative purposes, in various embodiments.

In example embodiments, the first optical element 122 comprises the first diffusing particles and/or structures 132, wherein the first diffusing particles and/or structures 132 is transparent or semitransparent that allows light emitted by the two or more sets of LED packages to emit through with little to no additional diffusing. In example embodiments, the second optical element 124 comprises the second diffusing particles and/or structures 134, wherein the second diffusing particles and/or structures 134 comprise a fine texturing. The fine texturing is configured to facilitate the dispersion and/or the transmission of light. In some embodiments, the fine texturing of the second diffusing particles and/or structures 134 may also be configured to enhance the dispersion of light from one or more sets of LED packages, wherein the fine texturing creates a more even, appealing, and/or layered illumination. In example embodiments, the one or more additional optical elements 126 comprises the one or more additional diffusing particles and/or structures 136, wherein the one or more additional diffusing particles and/or structures 136 comprises a finer texture than that of the second diffusing particles and/or structures 134. In some embodiments, the one or more additional diffusing particles and/or structures 136 may be applied in a heavier detail, wherein the heavier detail texturing is configured to create a higher level of light. For example, the diffusing particles and/or structure of a respective optical element is configured to control how much light is diffracted out of the optical element along its length (extending outward from the housing 104 when the optical assembly is attached and/or secured to the housing 104) and/or the granularity or consistency with which light is diffracted out of the optical element.

In various embodiments, the one or more additional diffusing particles and/or structures 136 of the one or more additional optical elements 126 may work in conjunction with the second diffusing particles and/or structures 134 of the second optical element and/or the first diffusing particles and/or structures 132 of the optical element to create a layered lighting effect. In an example embodiment, the one or more additional optical element(s) 126 may be further configured to cover one or more individual LED packages, wherein the one or more additional optical element is disposed in the middle (e.g., a central region located along an optical axis) of the optical assembly and/or LED lamp or LED lighting device.

Example LED Lamp

FIG. 5 to FIG. 9 provide example perspective views of an LED lamp and/or portion of an LED lighting device including one or more LED lamps 100, in accordance with various embodiments of the present invention. FIG. 5 depicts an LED lamp 100 positioned in a vertical manner in accordance with embodiments of the present disclosure. In example embodiments, the LED lamp 100 may be positioned in a vertical manner, wherein the housing 104 is disposed vertically above the optical assembly 120. In example embodiments, the LED lamp 100 may further comprise an electrical connection system 140, wherein the electrical connection system 140 is configured to provide AC voltage and/or DC voltage to one or more LED lamp(s) 100. For example, the electrical connection system 140 may include one or more wires. In some embodiments, the electrical connection system 140 may further comprise an electrical prong (e.g., not depicted) on at least one end, wherein the prong is configured to be inserted into an electrical outlet to provide power to the one or more LED lamp(s) 100. In example embodiments, the electrical connection system 140 may be configured to act like a hanging element, wherein one or more LED lamp(s) may be strung horizontally causing the LED lamp(s) to be positioned in a vertical manner (depicted in FIG. 5).

Figure 6:
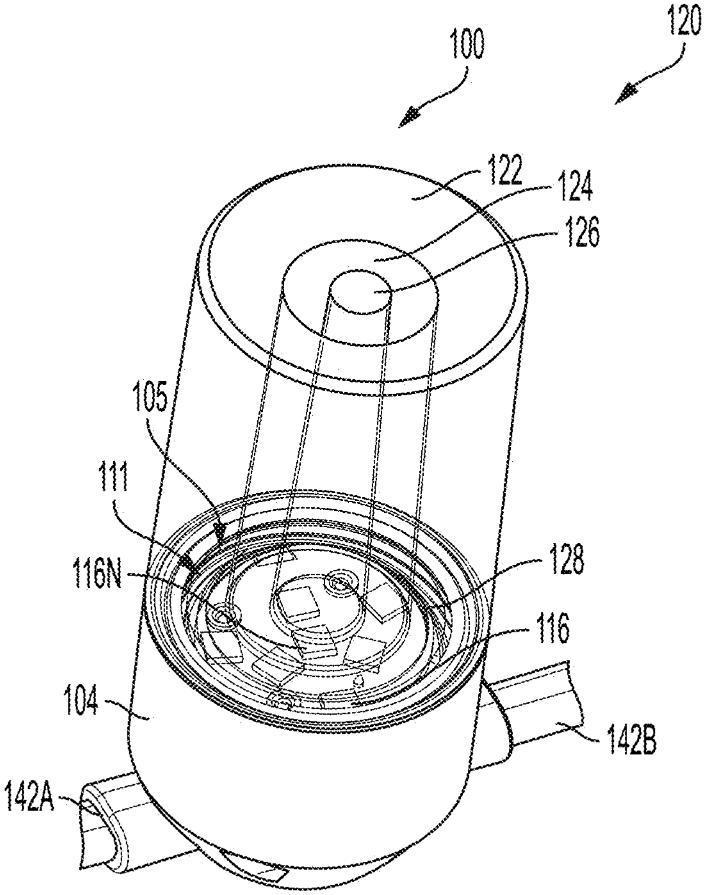
FIG. 6 illustrates an exemplary perspective view of an LED lamp in accordance with various embodiments of the present disclosure.
Figure 7:
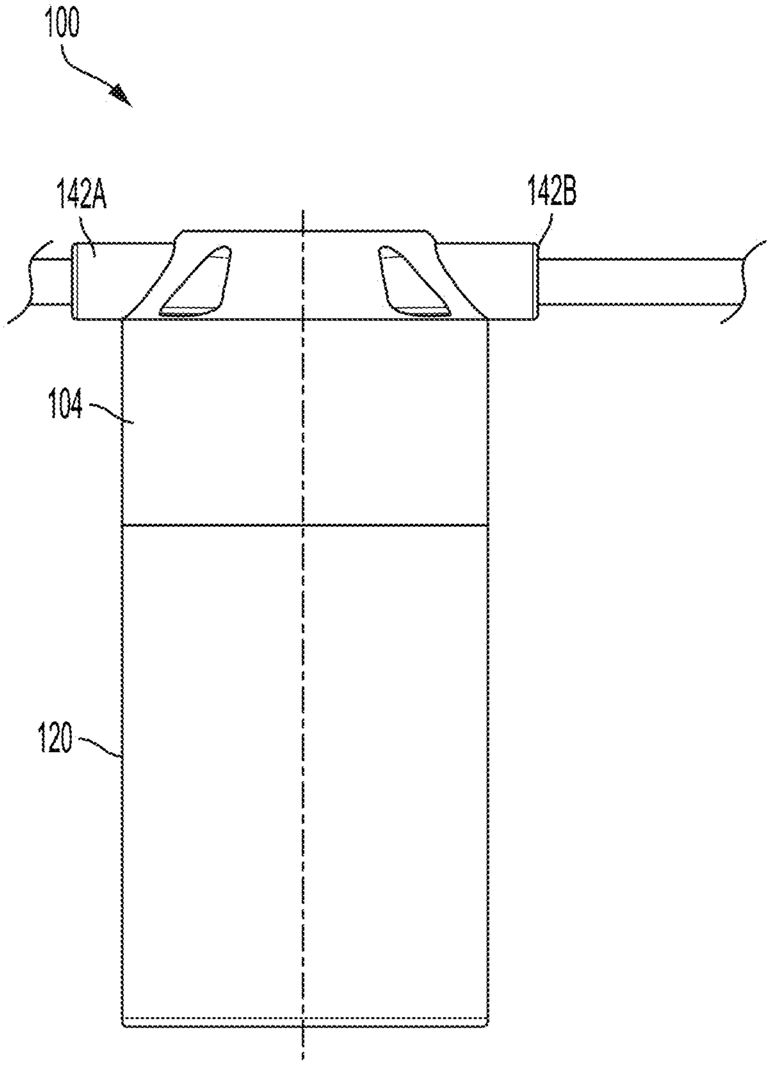
FIG. 7 illustrates an exemplary side perspective view an LED lamp in accordance with various embodiments of the present disclosure.

With reference to FIG. 6 and FIG. 7, example perspective views of an LED lighting device 110 are provide. In example embodiments, the LED lamp 100 comprises a transparent, semi-transparent, and/or textured optical assembly 120 configured to diffuse and/or transmit the light provided by two or more sets of LED packages 112 mounted onto a circuit board 118 mounted and/or secured within of the housing 104. For example, the sets of LED packages 112 mounted on the circuit board 118 may be similar to that illustrated in FIG. 1C. A disk optic 128 may be disposed between the circuit board 118 (and the LED packages 116 mounted thereto) and an opening 105 of the housing 104, wherein the disk optic 128 provides an initial diffusing of the light emitted by the LED packages 116 of the two or more sets of LED packages 112. In the depicted embodiment, the optical assembly 120 comprises three optical elements, wherein the first optical element 122 is the outermost element and the envelope of the LED lamp 100, the second optical element 124 is disposed within the first optical element 122, and the third optical element 126 is disposed within the second optical element 124 and the first optical element 122. In various embodiments, each of the first optical element 122, second optical element 124, and third optical element 126 is aligned and/or centered about the optical axis of the optical assembly 120 and/or LED lamp 100. In an example embodiment, one or more LED packages 116N may be located directly in alignment with the third optical element 126 (e.g., on an axis defined by the third optical element 126 and/or the optical axis of the optical assembly 120 and/or LED lamp 100).

With further reference to FIG. 6 and FIG. 7, in various embodiments, the LED lamp 100 may further comprise one or more electrical connections portions 142A, 142B configured to connect the LED lamp 100 with one or more additional LED lamps and/or power from one or more electrical outlets. For example, the LED lamp 100 may be part of an LED lighting device 110 including one or more LED lamps 100. In the depicted embodiment, the LED lamp 100 comprises a first electrical connection portion 142A disposed on a first side of the housing 104 and a second electrical connection portion 142B disposed linearly opposite to the first electrical connection portion 142A relative to the housing 104. In example embodiments, the LED lamp 100 may be connected with one or more additional LED lamps with the first electrical connection portion 142A and/or one or more additional LED lamps with the second electrical connection portion 142B. In some embodiments, the LED lamps 100 may be connected with a controller on a first side, wherein the controller may be configured to control one or more aspects (e.g., color, color brightness, temperature of color, patterns of lights, etc.) of the one or more LED lamp(s) 100. In various embodiments, the controller may be operated by a user, wherein the user can operate the controller directly or with a remote controlling device.

Figure 8:
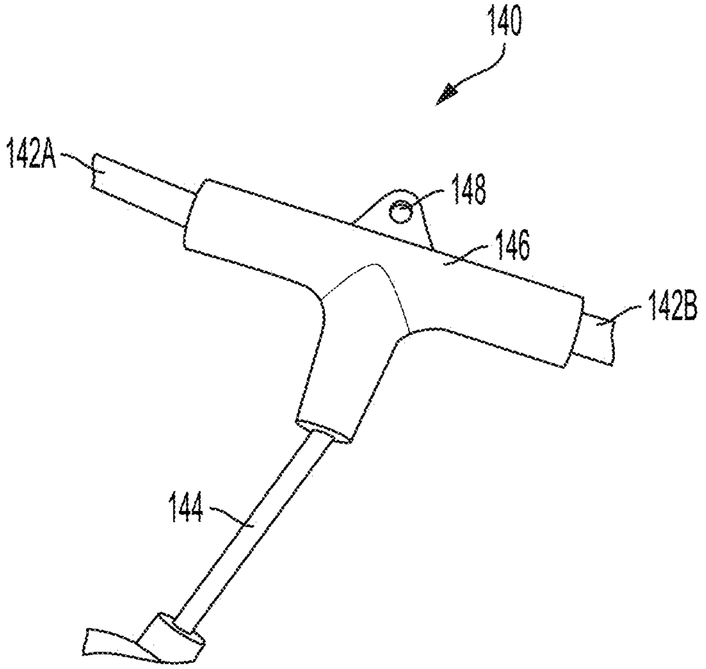
FIG. 8 illustrates an exemplary perspective view of an electrical connection system for incorporating an LED lamp into an example LED lighting device, in accordance with various embodiment of the present disclosure.

FIG. 8 illustrates an exemplary perspective view of an electrical connection system 140 for one or more LED lamp(s) in accordance with various embodiments of the present invention. In example embodiments, the electrical connection system 140 comprises a first electrical connection portion 142A, a second electrical connection portion 142B, a third electrical connection portion 144, and/or an electrical connection junction 146. In some embodiments, the electrical connection junction 146 may further comprise a connection portion 148, wherein the connection portion 148 may be configured to receive at least partially a fastener (e.g., screw, nail, bolt, zip tie, rope, hook, etc.) to assist in mounting the LED lighting device 110 including the LED lamp 100. In example embodiments, the electrical connection system 140 comprises a rubber and/or plastic material (e.g., silicone, polyvinyl chloride (PVC), ethylene chlorotrifluoroethylene (ECTFE), polyvinylidene fluoride (PVDF), fiberglass, etc.) to provide electrical insulation and/or waterproof the electrical connection system 140.

In example embodiments, electrical current may flow from the first electrical connection portion 142A towards the electrical connection junction 146. In some embodiments, the electrical current may flow through the electrical connection junction 146 through the third electrical connection portion 144, wherein the electrical current causes power to be provided to the corresponding LED lamp 100 connected to the third electrical connection portion 144. In other embodiments, the electrical current may flow through the electrical connection junction 146 towards the second electrical connection portion 142B, wherein the electrical current may cause power to be provided to one or more additional LED lamp(s). In other embodiments, the electrical current may flow through the electrical connection junction 146 and a portion of the electrical current flow through the second electrical connection portion 142B and the third electrical connection portion 144, wherein the electrical current causes power to be provided to the LED lamp and to one or more additional LED lamp(s).

Figure 9:
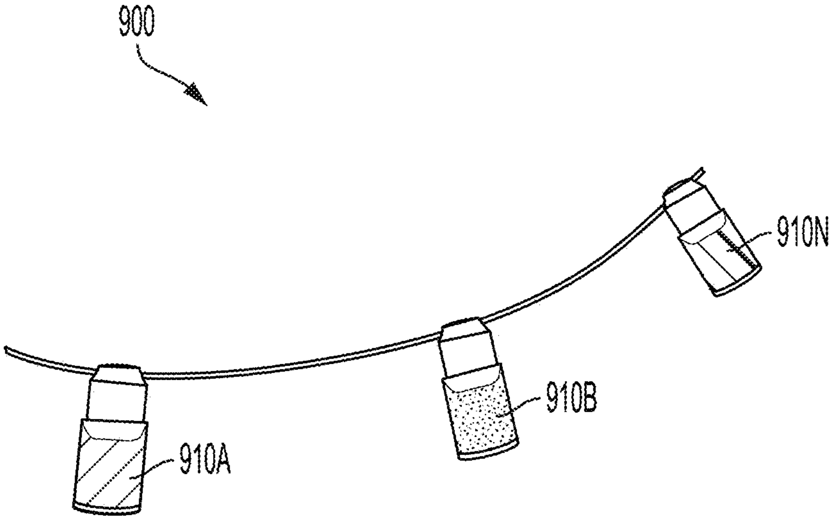
FIG. 9 illustrates an exemplary perspective view of a portion of an LED lighting device in accordance with various embodiments of the present disclosure.

FIG. 9 illustrates an example perspective view of a portion of an LED lighting device 110 comprising a plurality of LED lamps connected together in accordance with embodiments of the present invention. In example embodiments, the portion 900 of the LED lighting device 110 comprises a plurality of LED lamps 910A, 910B, 910N (collectively "910") configured to operate individually and/or simultaneously. In an example embodiment, the LED lamps 910 may be connected in a series and configured to operate simultaneously, wherein the plurality of LED lamps are configured to illuminate with the same qualities (e.g., light texture/pattern, color, brightness, color temperature, pattern, etc.). In other embodiments, the plurality of LED lamps 910 are connect in a series and configured to operate individually, wherein the first LED lighting device 910A may provide light having different qualities (e.g., light textures/patterns, color, brightness, color temperature, pattern, etc.) than the second LED lamp 910B and/or the one or more additional LED lamps 910N. In some embodiments, the LED lighting device may be a wall light, a path light, a filament bulb, a string light (or sting of lights), and/or the like.

FIGS. 14A, 14B, 14C, 14D, and 15 illustrate various example embodiments of LED lamps 100. For example, LED lamp 100A includes an optical assembly 120 similar to that shown in FIG. 11A.

LED lamp 100B includes an optical assembly where the second optical element and the additional optical element extend for a shorter distance along the optical axis of the LED lamp 100B than the first optical element. For example, the LED lamp 100B comprises an optical assembly comprising optical elements similar to those shown in FIGS. 12A, 12B, and 12C. For example, the second optical element and the additional optical element extend about three-quarters of the distance along the optical axis of the LED lamp 100B that the first optical element extends along the optical axis.

LED lamp 100C includes an optical assembly where the second optical element and the additional optical element extend for a shorter distance along the optical axis of the LED lamp 100C than the first optical element. For example, the second optical element and the additional optical element extend about one-third of the distance along the optical axis of the LED lamp 100B that the first optical element extends along the optical axis.

LED lamp 100D includes an optical assembly where each of the first optical assembly, second optical assembly, and additional optical assembly each extend substantially the same distance along the optical axis of the LED lamp 100D.

LED lamps 100E and 100F illustrate additional example embodiments of LED lamps including optical assemblies that include a plurality of optical elements, but the optical elements are not concentrically configured. For example, the optical assembly 120' includes an envelope 121, first optical element 122, second optical element 124, and an additional optical element 126. The envelope 121 of LED lamp 100E includes bubbles within the bulk material of the envelope. The envelope 121 of LED lamp 100F includes a depression or dimple in an end surface thereof. In LED lamps 100E and 100F, the first optical element 122, second optical element 124, and the third optical element 126 each cover wedges of the opening of the housing 104, rather than being positioned concentrically. For example, the first optical element 122, second optical element 124, and additional optical element 126 of the optical assembly 120' are each wedge-shaped. In various embodiments, the sets of LED packages 112 may also be correspondingly generally wedge-shaped.

Each of the partition optical elements 128A, 128B, 128C is configured to control dispersion of light emitted by a respective set of LED packages of the LED lamp 100E, 100F. As illustrated, the partition optical elements 128A, 128B, 128C extend a shorter distance along the optical axis of the LED lamp 100E, 100F than the first optical element 122. However, in various embodiments, the partition optical elements 128A, 128B, 128C may extend substantially the same distance along the optical axis as the first optical element 122.

Example LED Lighting Devices

In various embodiments, one or more LED lamps including two or more sets of LED packages and an optical assembly including at least two optical elements are incorporated into an LED lighting device. In various embodiments, the LED lighting device may be a light fixture, a sconce, a luminaire, a set of string lights, a path light or set of path lights, a light set, and/or the like.

FIGS. 16A, 16B, and 16D each illustrate an example embodiment of an LED lighting device 500A, 500B, 500C that is configured as a path light. For example, the LED lighting device 500A includes an LED lamp 100G and LED lighting device 500B includes an LED lamp 100H. The LED lamp 100G includes a housing 104 and an optical assembly 120 where at last the first optical element is generally prismatic in shape. The LED lamp 100H includes a housing 104 and an optical assembly 120 where at least the first optical element is frustoconical in shape. The LED lighting device 500A, 500B also includes an installation structure 160 configured for mounting and/or positioning the LED lighting device 500A, 500B in a desired location (e.g., along a path, for example). As should be understood, the installation structure 160 is further configured to provide an aesthetic appearance of the LED lighting device.

FIG. 16C provides a cross-sectional view of the LED lighting device 500C, according to an example embodiment, taken along the A-A line shown in FIG. 16D. The optical assembly 120 of the LED lighting device 500C includes a first optical element 122, a second optical element 124, and an additional optical element 126. The additional optical element 126 defines an open space 268 therein. The LED lighting device 500C includes two circuit boards 118 each having a respective LED arrangement (e.g., similar to that shown in FIG. 1D, for example) mounted thereto disposed at both ends of the optical assembly. In the illustrated embodiment, the LED lighting device 500C also includes at least one instance of driver circuitry 109 at each end of the optical assembly.

The LED lighting device 500C also includes a power cord 165 for connecting the electrical components of the LED lighting device 500C to an external power source (e.g., external battery, line voltage, and/or the like). The illustrated LED lighting device 500C also include a spike 162 secured to a bottom of the installation structure 160 configured to be stuck into the ground to hold the LED lighting device 500 in place.

FIGS. 17A, 17B, and 17C illustrate various embodiments of LED lighting devices 600A-H that are each configured as sconces. For example, as shown in FIG. 16B, an LED lighting device 600B configured for use as a sconce includes an optical assembly 120, at least one housing 104, and an installation structure 160. LED lighting device 600B includes two housings 104A, 104B disposed at opposite ends of the optical assembly 120. In such an embodiment, the optical elements 122, 124, 126 may be hollow cylinders such that LED packages may be mounted on both ends of the optical assembly 120.

As shown in FIG. 17C, LED lighting device 600D includes an optical assembly including four optical elements. The lengths of the optical elements along the optical axis of LED lamp are progressively longer such that the fourth optical element is longer than the third optical element, which is longer than the second optical element, which is longer than the first optical element.

In an example embodiment, an LED lighting device 600G is a downlight sconce lighting device. For example, the LED lighting device 600G is configured to emit light downward without emitting light in other directions.

Example Controlling Entity

Figure 10:
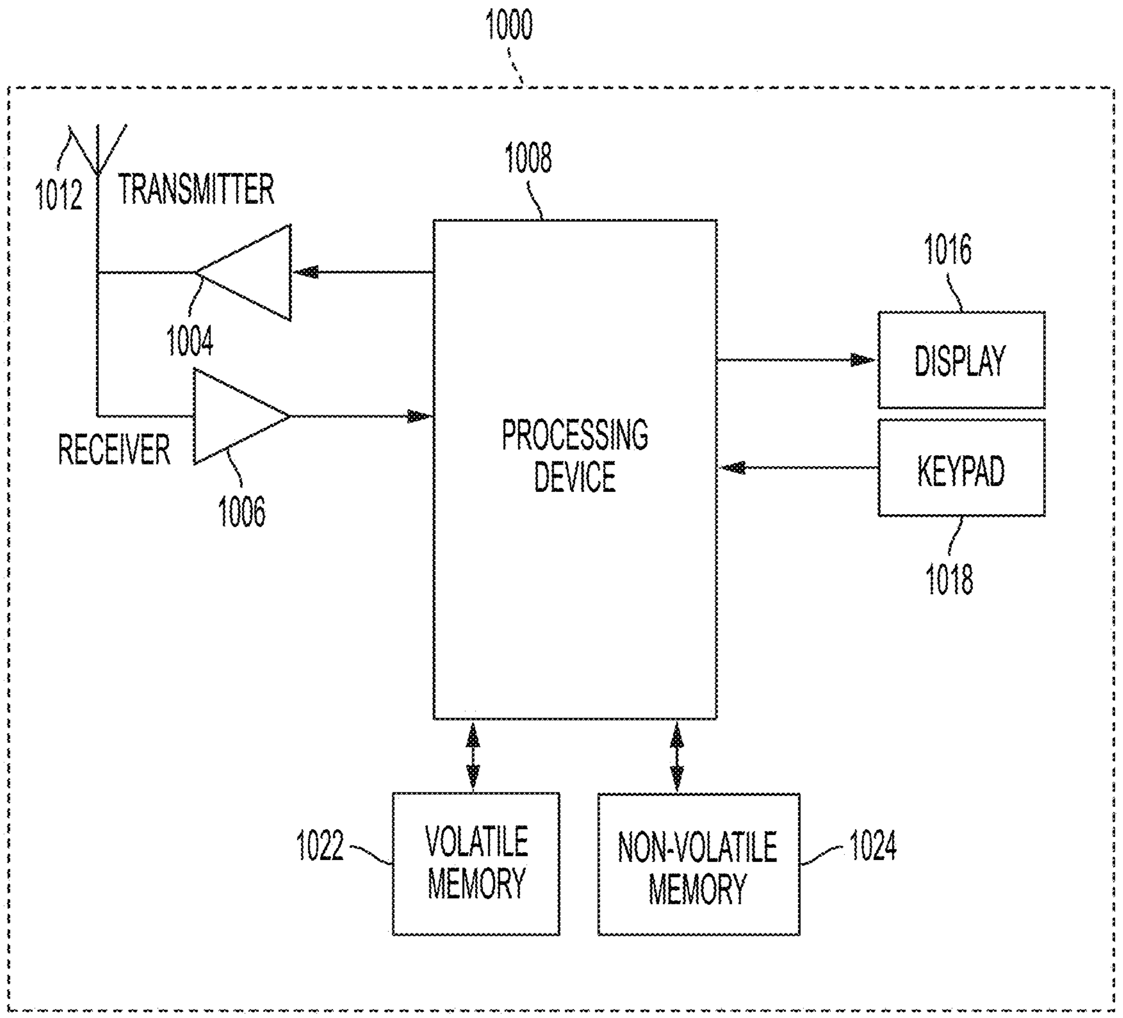
FIG. 10 illustrates an exemplary block diagram of a controlling entity that may be used as a remote in communication with an LED lighting device in accordance with various embodiments of the present disclosure.

FIG. 10 provides an illustrative schematic representative of a controlling entity 1000 that can be used in conjunction with embodiments of the present invention. In particular, the controlling entity 1000 may be configured to operate and/or execute an application and/or perform hardware-based functions configured to cause the controlling entity 1000 to control the various aspects of the light emitted by one or more LED lamps 100 of a lighting device 110. For example, the controlling entity 1000 may operate and/or execute an application configured to communicate with the LED lamp 100 and/or LED lighting device 110 and/or cause one or more aspects (e.g., color texture/pattern, brightness, pattern, color temperature, and/or the like and/or a combination thereof) of light emitted by the LED lamp 100 or LED lighting device 110 to be modified. In example embodiments, the controlling entity 1000 may be a mobile controlling entity such as a mobile phone, tablet, phablet, wearable computing device, personal digital assistant (PDA), MP3 player, and/or the like. In an example embodiment, the controlling entity 1000 may be a building control system (e.g., a digital addressable lighting interface (DALI)-based building control system). In another example embodiments, the controlling entity 1000 may be a fixed controlling entity such as a button, switch, or other user interface on the LED lamp 100 and/or LED lighting device 110.

As shown in FIG. 10, a controlling entity 1000 can include an antenna 1012, a transmitter 1004 (e.g., radio), a receiver 1006 (e.g., radio), and a processing element 1008 that provides signals to and receives signals from the transmitter 1004 and receiver 1006, respectively. The signals provided to and received from the transmitter 1004 and the receiver 1006, respectively, may include signaling information/data in accordance with an air interface standard of applicable wireless systems to communicate with various entities, such one or more LED lamp(s) 100, one or more LED lighting device(s), another controlling entity 1000, and/or the like. In this regard, the controlling entity 1000 may be capable of operating with one or more air interface standards, communication protocols, modulation types, and access types. More particularly, the controlling entity 1000 may operate in accordance with any of a number of wireless communication standards and protocols. In a particular embodiment, the controlling entity 1000 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, Thread protocols, USB protocols, and/or any other wireless protocol.

Via these communication standards and protocols, the controlling entity 1000 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The controlling entity 1000 can also download changes, add-ons, and updates, for instance, to its firmware, software (e.g., including executable instructions, applications, program modules), and operating system.

According to one embodiment, the controlling entity 1000 may include location determining aspects, devices, modules, functionalities, and/or similar words used herein interchangeably. For example, the controlling entity 1000 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the controlling entity 1000 position in connection with a variety of other systems, including cellular towers, Wi-Fi access points, and/or the like. Similarly, the controlling entity 1000 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The controlling entity 1000 may also comprise a user interface (that can include a display 1016 coupled to a processing element 1008) and/or a user input interface (coupled to a processing element 1008). In an example embodiment, the display 1016 is a touchscreen. For example, the user interface may be an application, browser, user interface, dashboard, webpage, motion sensor, sound sensor, light sensor and/or similar words used herein interchangeably executing on and/or accessible via the controlling entity 1000 to interact with and/or cause display of information. For example, the controlling entity 1000 may detect may receive a signal from the user interface (e.g., motion, sound, tap, click, etc.), wherein the signal may cause a specific lighting sequence and/or lighting response to be triggered to the one or more LED lamps 100. The user input interface can comprise any of a number of devices allowing the controlling entity 1000 to receive data, such as a keypad 1018 (hard or soft), a touch display, voice/speech or motion interfaces, scanners, readers, or other input device. In embodiments including a keypad 1018, the keypad 1018 can include (or cause display of) the conventional numeric (0-9) and related keys (#, *), and other keys used for operating the controlling entity 1000 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the controlling entity 1000 can collect contextual information/data as part of the telematics data.

In various embodiments, the user interface provides control over various optical effects of an LED lamp or lighting device. For example, a user maybe able to control the optical effects (e.g., emitted light color) for each set of LED packages 112 of the LED lamp or lighting device. For example, in an example embodiment, the user interface enables a user to "paint" or "draw" (e.g., via interaction with the user interface) different portions or surfaces of the optical assembly within each LED lamp or lighting device to create customized, unique, and/or personalized mixtures of colors of light emitted by the respective LED lamp or lighting device.

The controlling entity 1000 can also include volatile storage or memory 1022 and/or non-volatile storage or memory 1024, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the controlling entity 1000.

CONCLUSION

Many modifications and other embodiments of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An LED lighting device or LED lamp comprising: two or more sets of LED packages, wherein each of the two or more sets of LED packages comprises at least one respective LED package, the two or more sets of LED packages comprising a first set of LED packages and a second set of LED packages; wherein the two or more sets of LED packages are mounted in a concentric pattern with respect to a housing: a first optical element having a light incident surface optically coupled to the first set of LED packages to control light dispersion of light emitted by the first set of LED packages; and a second optical element having a light incident surface optically coupled to the second set of LED packages to control light dispersion of light emitted by the second set of LED packages, wherein the first optical element and the second optical element are configured to be arranged as concentric structures, such that the first optical element is configured as an outermost optical element, the second optical element is within the first optical element, and the first optical element is disposed, at least in part, on top and around the second optical element.

2. The LED lighting device or LED lamp of claim 1, further comprising:

a third set of LED packages; and a third optical element, wherein the third optical element is configured to control dispersion of light emitted by the third set of LED packages.

3. The LED lighting device or LED lamp of claim 2, wherein the first optical element, the second optical element, and the third optical element are nested.

4. The LED lighting device or LED lamp of claim 1, wherein the first set of LED packages is configured to emit light of a different color than light emitted by the second set of LED packages.

5. The LED lighting device or LED lamp of claim 1, wherein a third optical element is configured to be disposed, at least in part, within the second optical element.

6. The LED lighting device or LED lamp of claim 1, wherein the first optical element is configured to be an envelope of the LED lighting device or LED lamp.

7. The LED lighting device or LED lamp of claim 1, wherein at least one of (a) the first optical element comprises first diffusing particles, diffusing structure, or surface treatment or (b) the second optical element comprises second diffusing particles, structure, or surface treatment.

8. The LED lighting device or LED lamp of claim 1, wherein the first optical element and the second optical element are nested.

9. An LED lighting device or LED lamp comprising: a housing; a plurality of sets of LED packages mounted with respect to the housing, wherein each of the plurality of sets of LED packages comprises a respective at least one individual LED package; wherein the plurality of sets of LED packages are mounted in a concentric pattern with respect to the housing; and an optical assembly comprising a plurality of optical elements, wherein each optical element of the plurality of optical elements having a light incident surface that is optically coupled to a respective set of the LED packages to control light dispersion of light emitted by the respective set of LED packages of the plurality of sets of LED packages; wherein the plurality of optical elements of the optical assembly are configured to be arranged in a concentric structure, such that a first optical element of the plurality of optical elements is configured as an outermost optical element, a second optical element of the plurality of optical elements is within the first optical element, and the first optical element of the plurality of optical elements is disposed, at least in part, on top and around the second optical element of the plurality of optical elements.

10. The LED lighting device or LED lamp of claim 9, wherein the plurality of sets of LED packages comprises a first set of LED packages configured to emit light of a first color and a second set of LED packages configured to emit light of a second color, wherein the first color and the second color are different from one another.

11. The LED lighting device or LED lamp of claim 9, wherein at least one of the first or second optical elements comprise diffusing particles or a diffusing surface treatment.

12. The LED lighting device or LED lamp of claim 9, wherein the plurality of optical elements comprise a plurality of nesting cylindrical structures.

13. The LED lighting device or LED lamp of claim 9, wherein the plurality of optical elements comprises a first optical element configured as a lamp envelope of the LED lighting device or LED lamp.

14. The LED lighting device or LED lamp of claim 9, wherein at least one of (a) the housing is further configured to connect with one or more additional housings such that the housing and the one or more additional housings are connected in a series or (b) the LED lighting device includes an installation structure.

15. The LED lighting device or LED lamp of claim 9, wherein the plurality of optical elements comprise a plurality of nesting frustoconical structures.

* * * * *